US012563601B2

(12) United States Patent
Zhang et al.

(10) Patent No.: US 12,563,601 B2
(45) Date of Patent: Feb. 24, 2026

(54) TERMINAL AND COMMUNICATION METHOD THEREOF IN WIRELESS COMMUNICATION SYSTEM

(71) Applicant: Samsung Electronics Co., Ltd., Gyeonggi-do (KR)

(72) Inventors: Sa Zhang, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 430 days.

(21) Appl. No.: 18/093,998

(22) Filed: Jan. 6, 2023

(65) Prior Publication Data

US 2023/0224968 A1 Jul. 13, 2023

(30) Foreign Application Priority Data

| | | | |
|---|---|---|---|
| Jan. 7, 2022 | (CN) | .......................... | 202210016313.0 |
| Feb. 10, 2022 | (CN) | .......................... | 202210126297.0 |
| May 11, 2022 | (CN) | .......................... | 202210515279.1 |
| Aug. 10, 2022 | (CN) | .......................... | 202210956588.2 |
| Sep. 28, 2022 | (CN) | .......................... | 202211194319.3 |

(Continued)

(51) Int. Cl.
| | |
|---|---|
| *H04W 72/04* | (2023.01) |
| *H04W 72/11* | (2023.01) |
| *H04W 72/1273* | (2023.01) |
| *H04W 72/23* | (2023.01) |
| *H04W 74/04* | (2009.01) |

(Continued)

(52) U.S. Cl.
CPC ........ *H04W 74/0825* (2013.01); *H04W 72/11* (2023.01); *H04W 72/1273* (2013.01); *H04W*

*72/23* (2023.01); *H04W 74/04* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 12,369,127 B2 * | 7/2025 | Kim | ................... H04W 52/146 |
| 2018/0352582 A1 | 12/2018 | Yi et al. | |

(Continued)

FOREIGN PATENT DOCUMENTS

| | | |
|---|---|---|
| WO | WO 2020/168223 | 8/2020 |
| WO | WO 2021/260604 | 12/2021 |
| WO | WO 2022/000318 | 1/2022 |

OTHER PUBLICATIONS

International Search Report dated Apr. 10, 2023 issued in counterpart application No. PCT/KR2023/000327, 6 pages.

*Primary Examiner* — Willie J Daniel, Jr.

(74) *Attorney, Agent, or Firm* — The Farrell Law Firm, P.C.

(57) ABSTRACT

Disclosed is a method performed by a terminal in a wireless communication system that includes identifying that a first uplink channel collides with a second uplink channel and a first downlink channel, resolving a collision between the first uplink channel and the first downlink channel by not transmitting a time unit of the first uplink channel that collides with the first downlink channel in case that a first predefined condition is satisfied, resolving a collision between the first uplink channel and the second uplink channel, and performing a downlink reception or an uplink transmission based on at least one of the first uplink channel, the second uplink channel or the first downlink channel.

13 Claims, 15 Drawing Sheets

(30) Foreign Application Priority Data

Oct. 11, 2022 (CN) .......................... 202211242520.4
Nov. 9, 2022 (CN) .......................... 202211400834.2

(51) Int. Cl.
 *H04W 74/08* (2009.01)
 *H04W 74/0808* (2024.01)

(56) References Cited

U.S. PATENT DOCUMENTS

2021/0258981 A1 8/2021 Hosseini et al.
2023/0344583 A1* 10/2023 Yi .......................... H04L 5/0053

* cited by examiner

FIG. 7A

| row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

FIG. 7B

| row index | $\{K_0, S, L\}$ set |
|---|---|
| 1 | $\{0, 0, 7\}, \{1, 2, 7\}, \{2, 4, 4\}$ |
| 2 | $\{1, 3, 4\}, \{3, 5, 7\}$ |
| 3 | $\{0, 0, 7\}, \{3, 7, 7\}$ |

FIG. 8

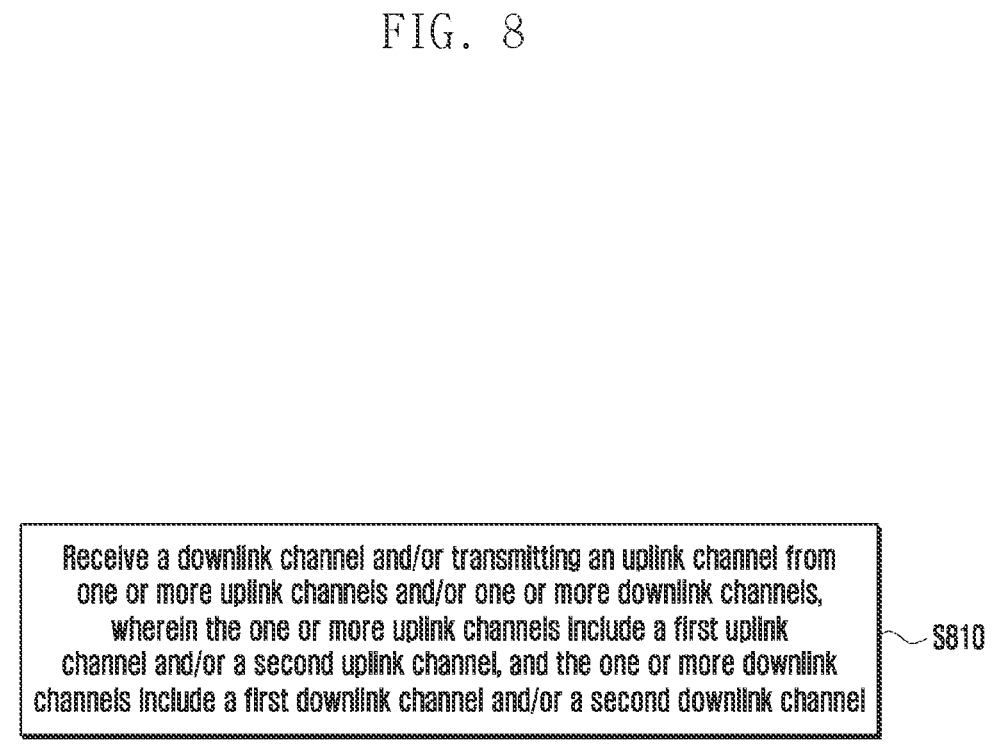

Receive a downlink channel and/or transmitting an uplink channel from one or more uplink channels and/or one or more downlink channels, wherein the one or more uplink channels include a first uplink channel and/or a second uplink channel, and the one or more downlink channels include a first downlink channel and/or a second downlink channel ~ S810

TERMINAL AND COMMUNICATION METHOD THEREOF IN WIRELESS COMMUNICATION SYSTEM

CROSS-REFERENCE TO RELATED APPLICATION(S)

This application is based on and claims priority under 35 U.S.C. § 119(a) to Chinese Patent Application Nos. 202210016313.0, 202210126297.0, 202210515279.1, 202210956588.2, 202211194319.3, 202211242520.4, and 202211400834.2, which were filed in the China National Intellectual Property Administration on Jan. 7, 2022, Feb. 10, 2022, May 11, 2022, Aug. 10, 2022, Sep. 28, 2022, Oct. 11, 2022, and Nov. 9, 2022, respectively, the entire disclosure of each of which is incorporated herein by reference.

BACKGROUND

1. Field

The disclosure relates generally to wireless communication and, in particular, to a terminal and a method of communication in a wireless communication system.

2. Description of the Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

According to an embodiment, a communication method performed by a terminal in a wireless communication system is provided. The communication method including at least one of receiving downlink channels and transmitting uplink channels from at least one of one or more uplink channels and one or more downlink channels. The one or more uplink channels include at least one of a first uplink channel and a second uplink channel, and the one or more downlink channels include at least one of a first downlink channel and a second downlink channel.

According to another embodiment, a terminal in a wireless communication system is provided, the terminal including a transceiver configured to transmit and receive signals, and a controller coupled to the transceiver and configured to at least one of receive a downlink channel and transmitting an uplink channel from at least one of one or more uplink channels and one or more downlink channels, with the one or more uplink channels including at least one of a first uplink channel and a second uplink channel, and with the one or more downlink channels including at least one of a first downlink channel and a second downlink channel.

According to another embodiment, a method performed by a terminal in a wireless communication system includes identifying that a first uplink channel collides with a second uplink channel and a first downlink channel, resolving a collision between the first uplink channel and the first downlink channel by not transmitting a time unit of the first uplink channel that collides with the first downlink channel in case that a first predefined condition is satisfied, resolving a collision between the first uplink channel and the second uplink channel, and performing a downlink reception or an uplink transmission based on at least one of the first uplink channel, the second uplink channel or the first downlink channel.

According to another embodiment, a terminal in a wireless communication system includes a transceiver configured to transmit and receive signals, and a controller coupled to the transceiver, where the controller is configured to identify that a first uplink channel collides with a second uplink channel and a first downlink channel, resolve a collision between the first uplink channel and the first downlink channel by not transmitting a time unit of the first uplink channel that collides with the first downlink channel in case that a first predefined condition is satisfied, resolve a collision between the first uplink channel and the second uplink channel, and perform a downlink reception or an uplink transmission based on at least one of the first uplink channel, the second uplink channel or the first downlink channel.

BRIEF DESCRIPTION OF THE DRAWINGS

The above and other aspects, features, and advantages of certain embodiments will be more apparent from the following description taken in conjunction with the accompanying drawings, in which: an embodiment

FIGS. 7A and 7B illustrate time domain resource allocation (TDRA) tables according to an embodiment;

FIG. 8 is a flowchart illustrating a method performed by a terminal according to an embodiment;

DETAILED DESCRIPTION

Figure 1:
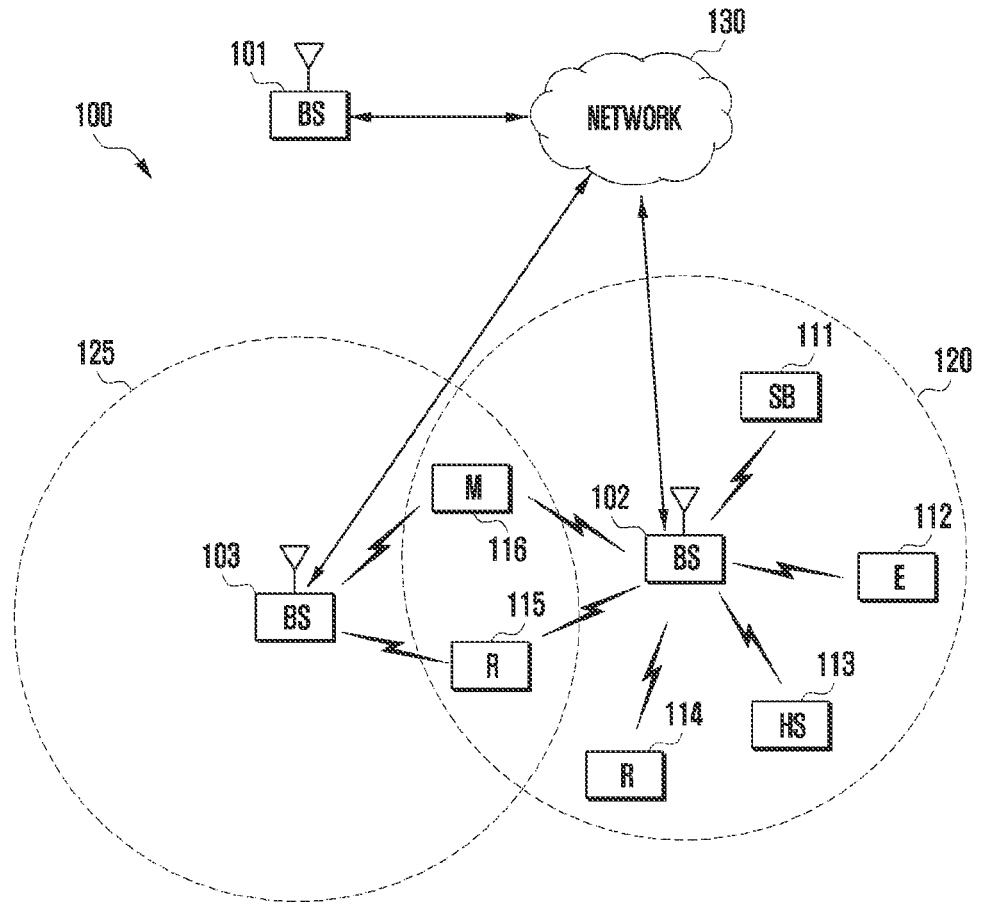
FIG. 1 illustrates a wireless network according to an embodiment.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments are provided for completeness, and to fully convey the concept of the disclosure to one of ordinary skill in the art.

When embodiments are described herein, descriptions of techniques which are well known in the technical field to which the disclosure pertains and are not directly related to the disclosure will be omitted. This is to clearly convey the concept of the disclosure by omitting descriptions of unnecessary details.

The term couple and its derivatives refer to any direct or indirect communication between two or more elements, whether or not those elements are in physical contact with one another. The terms transmit, receive, and communicate, as well as derivatives thereof, encompass both direct and indirect communication. The terms include and comprise, as well as derivatives thereof, mean inclusion without limitation. The term or is inclusive, meaning and/or. The phrase associated with, as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term controller means any device, system or part thereof that controls at least one operation. Such a controller can be implemented in hardware or a combination of hardware and software and/or firmware. The functionality associated with any particular controller can be centralized or distributed, whether locally or remotely.

The phrase at least one of, when used with a list of items, means that different combinations of one or more of the listed items can be used, and only one item in the list can be needed. For example, at least one of: A, B, and C includes any of the following combinations: A, B, C, A and B, A and C, B and C, and A and B and C. For example, at least one of: A, B, or C includes any of the following combinations: A, B, C, A and B, A and C, B and C, and A, B and C.

Various functions described below can be implemented or supported by one or more computer programs, each of which is formed from computer-readable program code and embodied in a computer-readable medium. The terms application and program refer to one or more computer programs, software components, sets of instructions, procedures, functions, objects, classes, instances, related data, or a portion thereof adapted for implementation in a suitable computer-readable program code. The phrase computer-readable program code includes any type of computer code, including source code, object code, and executable code. The phrase computer-readable medium includes any type of medium capable of being accessed by a computer, such as read-only memory (ROM), random access memory (RAM), a hard disk drive, a compact disc (CD), a digital video disc (DVD), or any other type of memory. A non-transitory computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments are not intended to limit and/or define the scope of the disclosure.

It should be understood that first, second and similar words used herein do not express any order, quantity or importance, but are only used to distinguish different components. Similar words such as singular forms a, an or the do not express a limitation of quantity, but express the existence of at least one of the referenced item, unless the context clearly dictates otherwise. For example, reference to a component surface includes reference to one or more of such surfaces.

As used herein, reference to an example, an implementation or implementation, an embodiment or embodiment means that particular elements, features, structures or characteristics described in connection with the embodiment are included in at least one embodiment. The phrases in one embodiment or in one example appearing in different places in the specification do not necessarily refer to the same embodiment.

As used herein, a portion of something means at least some of the thing, and as such may mean less than all of, or all of, the thing. As such, a portion of a thing includes the entire thing as a special case, i.e., the entire thing is an example of a portion of the thing.

As used herein, the term set means one or more. Accordingly, a set of items can be a single item or a collection of two or more items.

In this disclosure, to determine whether a specific condition is satisfied or fulfilled, expressions, such as greater than or less than are used by way of example and expressions, such as greater than or equal to or less than or equal to are also applicable and not excluded. For example, a condition defined with greater than or equal to may be replaced by greater than (or vice-versa), a condition defined with less than or equal to may be replaced by less than (or vice-versa), etc.

Similar words such as the term include or comprise indicate that elements or objects appearing before the word encompass the listed elements or objects appearing after the word and their equivalents, but other elements or objects are not excluded. Similar words such as connect or connected are not limited to physical or mechanical connection, but can include electrical connection, whether direct or indirect. Upper, lower, left and right are only used to express a relative positional relationship, and when an absolute position of the described object changes, the relative positional relationship may change accordingly.

The embodiments, as discussed below, are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to long term evolution (LTE) and/or 5G communication systems, those skilled in the art will understand that the main points of the disclosure can also be applied to other communication systems with similar technical backgrounds and channel formats with slight modifications without departing from the scope of the disclosure.

The technical schemes of the embodiments can be applied to various communication systems, and for example, the communication systems may include global systems for mobile communications (GSM), code division multiple access (CDMA) systems, wideband code division multiple access (WCDMA) systems, general packet radio service (GPRS) systems, LTE systems, LTE frequency division duplex (FDD) systems, LTE time division duplex (TDD) systems, universal mobile telecommunications system (UMTS), worldwide interoperability for microwave access (WiMAX) communication systems, 5G systems or new radio (NR) systems, etc. In addition, the technical schemes of the embodiments of the present application can be applied to future-oriented communication technologies. In addition, the technical schemes of the embodiments of the present application can be applied to future-oriented communication technologies.

Hereinafter, the embodiments of the disclosure will be described in detail with reference to the accompanying drawings. In the drawings, some elements may be exaggerated, omitted, or roughly illustrated. Also, size of each element does not exactly correspond to an actual size of each element. In the drawings, elements that are the same or are in correspondence may be identified with the same or similar reference numerals.

FIGS. 1-3B describe various embodiments implemented by using orthogonal frequency division multiplexing (OFDM) or orthogonal frequency division multiple access (OFDMA) communication technologies in wireless communication systems. The descriptions of FIGS. 1-3B do not mean physical or architectural implications for the manner in which different embodiments may be implemented. Different embodiments of the disclosure may be implemented in any suitably arranged communication systems.

FIG. 1 illustrates a wireless network according to an embodiment.

Referring to FIG. 1, a wireless network 100 includes a gNodeB (gNB) 101, a gNB 102, and a gNB 103. The gNB 101 communicates with the gNB 102 and the gNB 103. The gNB 101 also communicates with at least one Internet protocol (IP) network 130, such as the Internet, a private IP network, or other data networks.

Depending on a type of the network, other well-known terms such as base station (BS) or access point (AP) can be used instead of gNodeB or gNB. For convenience, the terms gNodeB and gNB are used herein to refer to network infrastructure components that provide wireless access for remote terminals. Depending on the type of the network, other well-known terms such as mobile station, user station, remote terminal, wireless terminal or user apparatus can be used instead of user equipment or UE. For example, the terms terminal, user equipment and UE may be used in this patent document to refer to remote wireless devices that wirelessly access a gNB, no matter whether the UE is a mobile device (such as a mobile phone or a smart phone) or a fixed device (such as a desktop computer or a vending machine).

The gNB 102 provides wireless broadband access to the network 130 for a first plurality of UEs within a coverage area 120 of the gNB 102. The first plurality of UEs include a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The gNB 103 provides wireless broadband access to network 130 for a second plurality of UEs within a coverage area 125 of the gNB 103. The second plurality of UEs include a UE 115 and a UE 116. One or more of gNBs 101-103 can communicate with each other and with UEs 111-116 using 5G, LTE, LTE-A, WiMAX or other advanced wireless communication technologies.

The dashed circles in FIG. 1 illustrate approximate ranges of the coverage areas 120 and 125, and the ranges are shown as approximate circles merely for illustration and explanation purposes. The coverage areas associated with the gNBs, such as the coverage areas 120 and 125, may have other shapes, including irregular shapes, depending on configurations of the gNBs and changes in the radio environment associated with natural obstacles and man-made obstacles.

As further described below, one or more of the gNBs 101, 102, and 103 may include a two-dimensional (2D) antenna array as described in embodiments of the disclosure. One or more of the gNBs 101, 102, and 103 may support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Further, the gNB 101 can directly communicate with any number of UEs and provide wireless broadband access to the network 130 for those UEs. Similarly, each of the gNBs 102 and 103 can directly communicate with the network 130 and provide direct wireless broadband access to the network 130 for the UEs. In addition, the gNBs 101, 102 and/or 103 can provide access to other or additional external networks, such as external telephone networks or other types of data networks.

Figure 2A:
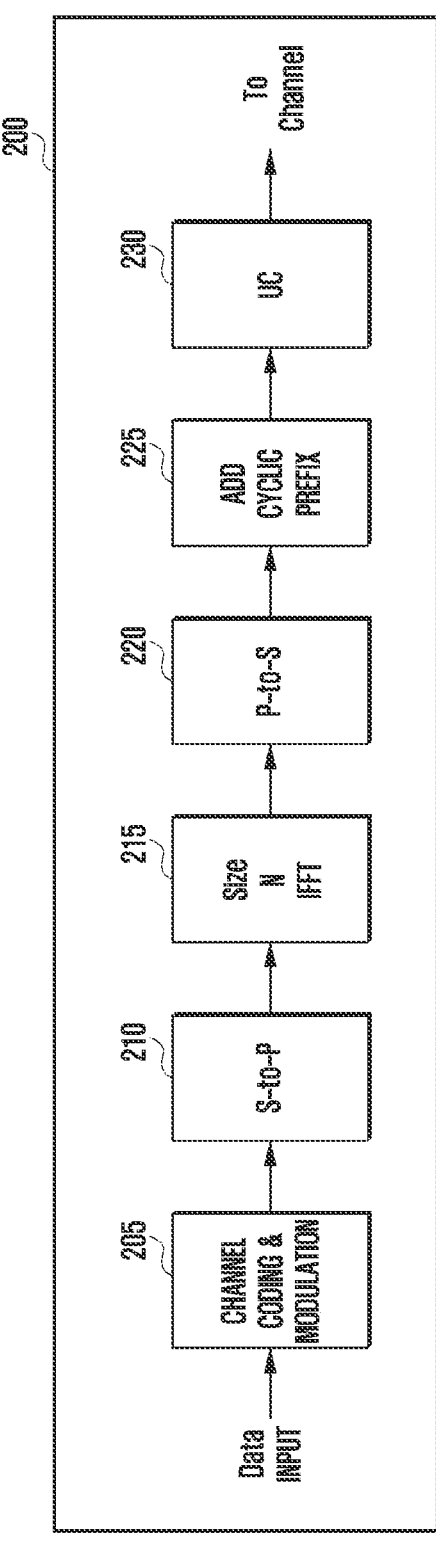
FIGS. 2A and 2B illustrate wireless transmission and reception paths according to an embodiment.
Figure 2B:
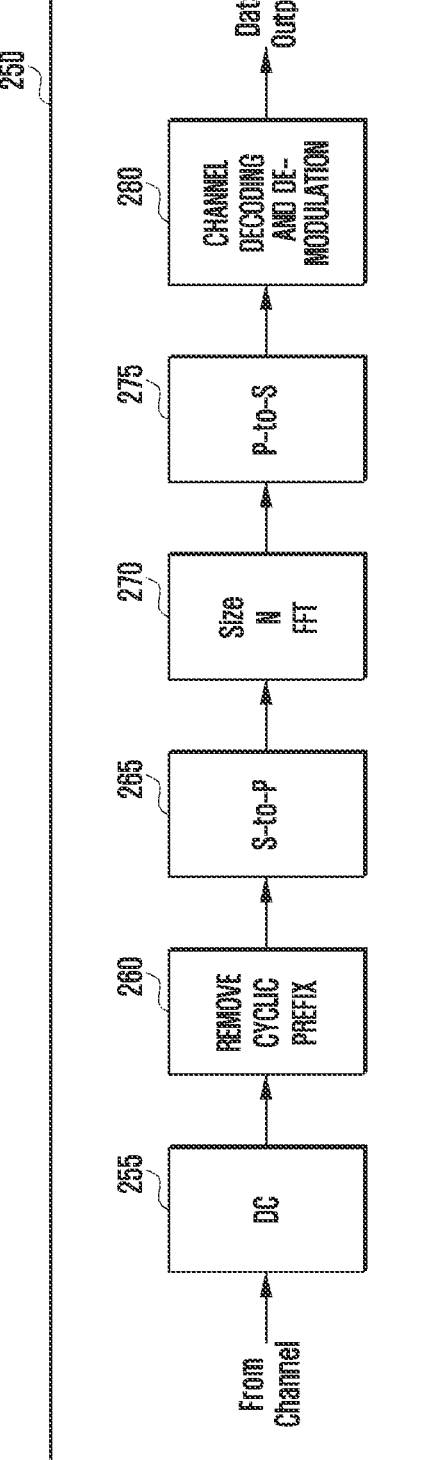

FIGS. 2A and 2B illustrate wireless transmission and reception paths according to an embodiment.

Referring to FIGS. 2A and 2B, a transmission path 200 can be described as being implemented in a gNB, such as the gNB 102, and a reception path 250 can be described as being implemented in a UE, such as UE 116. However, the reception path 250 can also be implemented in a gNB and the transmission path 200 can also be implemented in a UE. The reception path 250 may be configured to support codebook designs and structures for systems with 2D antenna arrays.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or QAM) to generate a sequence of frequency-domain modulated symbols. The S-to-P block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The P-to-S block 220 converts (e.g., multiplexes) parallel time domain output symbols from the size N IFFT block 215 to generate a serial time domain signal. The cyclic prefix addition block 225 inserts a cyclic prefix into the time domain signal. The UC 230 modulates (such as up-converts) the output of the cyclic prefix addition block 225 to a radio frequency (RF) for transmission via a wireless channel. The signal can also be filtered at a baseband before switching to the RF frequency.

The RF signal transmitted from the gNB 102 arrives at UE 116 after passing through the wireless channel, and operations in reverse to those at the gNB 102 are performed at the UE 116. The DC 255 down-converts the received signal to a baseband frequency, and the cyclic prefix removal block 260 removes the cyclic prefix to generate a serial time domain baseband signal. The S-to-P block 265 converts the time domain baseband signal into a parallel time domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of the gNBs 101, 102, and 103 may implement a transmission path 200 for transmitting to the UEs 111-116 in the downlink, and may implement a reception path 250 for receiving from the UEs 111-116 in the uplink. Similarly, each of the UEs 111-116 may implement a transmission path 200 for transmitting to the gNBs 101, 102, and 103 in the uplink, and may implement a reception path 250 for receiving from the gNBs 101, 102, and 103 in the downlink.

Each component in FIGS. 2A and 2B can be implemented using only hardware, or using a combination of hardware and software/firmware. For example, at least some of the components in FIGS. 2A and 2B may be implemented in software, while other components may be implemented in configurable hardware or a combination of software and configurable hardware. The FFT block 270 and IFFT block 215 may be implemented as configurable software algorithms, in which the value of the size N may be modified according to the implementation.

The description as using FFT and IFFT is illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, subdivided or omitted, and additional components can be added according to specific requirements. FIGS. 2A and 2B are intended to illustrate examples of types of transmission and reception paths that can be used in a wireless network. Any other suitable architecture can be used to support wireless communication in a wireless network.

Figure 3A:
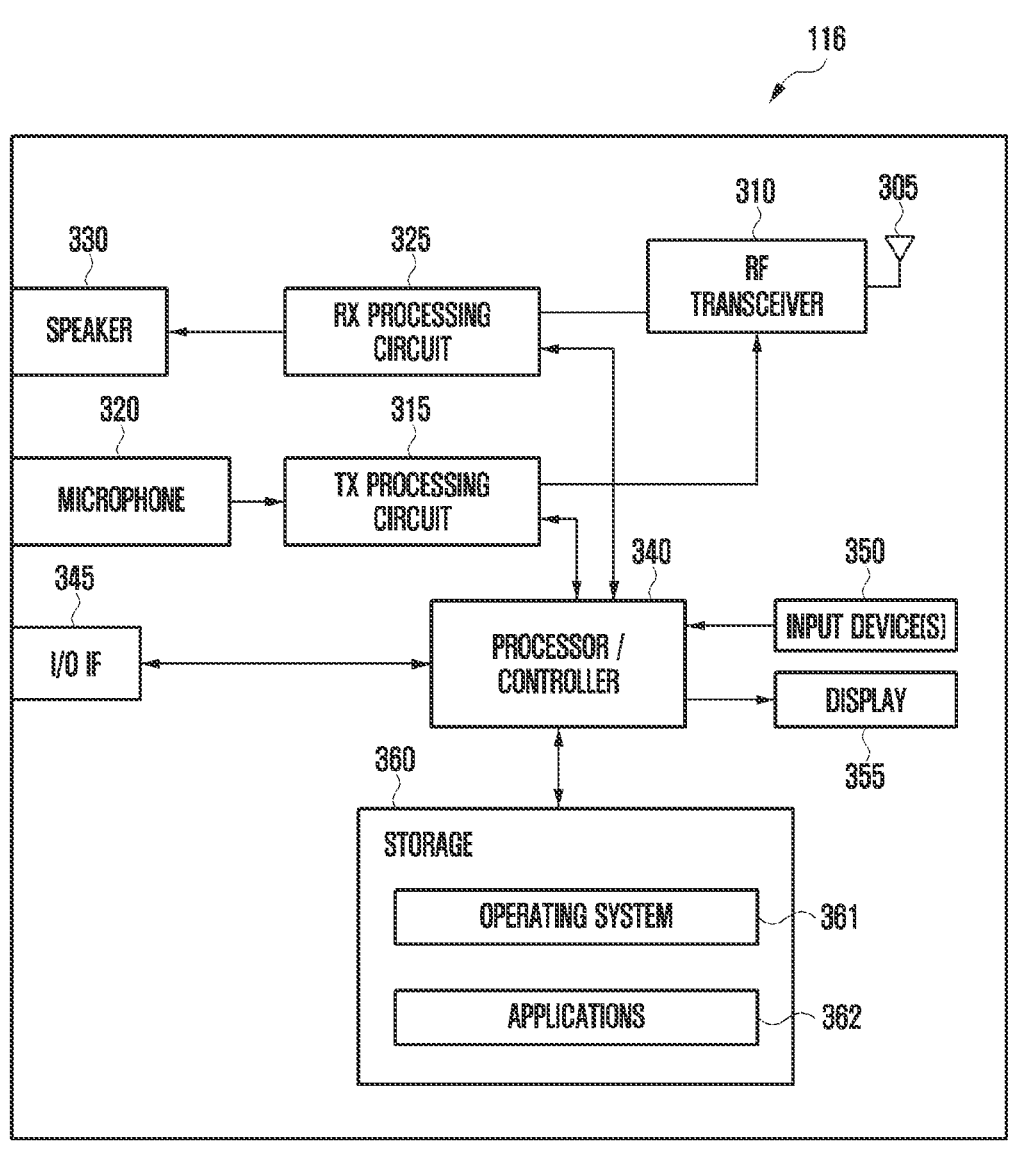
FIG. 3A illustrates a user equipment (UE) according to an embodiment.

FIG. 3A illustrates a UE according to an embodiment. The embodiment of the UE 116 in FIG. 3A is for illustration only, and the UEs 111-115 of FIG. 1 can have the same or similar configuration. A UE will have various configurations, not limited to the configuration provided in FIG. 3A.

Referring to FIG. 3A, the UE 116 includes an antenna 305, an RF transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to the speaker 330 (such as for voice data) or to the processor/controller 340 for further processing (such as for web browsing data).

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 may execute other processes and programs residing in the memory 360, such as operations for channel quality measurement and reporting for systems with 2D antenna arrays as described in embodiments of the disclosure. The processor/controller 340 can move data into or out of the memory 360 as required by an execution process. The processor/controller 340 may be configured to execute the application 362 based on the OS 361 or in response to signals received from the gNB or the operator. The processor/controller 340 is also coupled to the I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display (LCD) or other display capable of presenting text and/or at least limited graphics (such as from a website). The memory 360 is coupled to the processor/controller 340. A part of the memory 360 can include a RAM, while another part of the memory 360 can include a flash memory or other ROM.

Various changes can be made to the UE 116 of FIG. 3A. For example, various components in FIG. 3A can be combined, subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
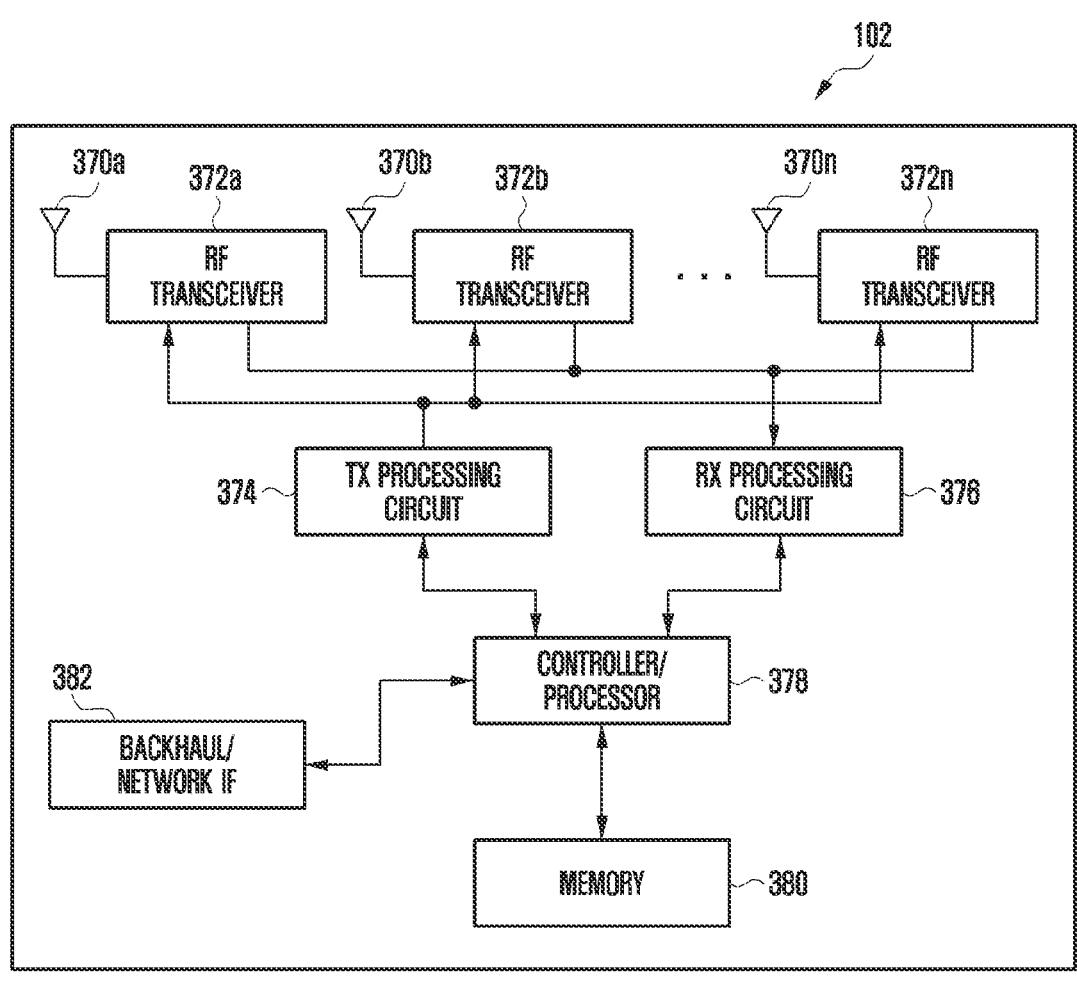
FIG. 3B illustrates a gNB according to an embodiment.

FIG. 3B illustrates a gNB according to an embodiment. The gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. For example, the gNB 101 and the gNB 103 can include the same or similar structures as gNB 102.

Referring to FIG. 3B, the gNB 102 includes a plurality of antennas 370a, 370b . . . 370n, a plurality of RF transceivers 372a, 372b, . . . 372n, a TX processing circuit 374, and an RX processing circuit 376. One or more of the plurality of antennas 370a, 370b . . . 370n may include a 2D antenna array. gNB 102 also includes a controller/processor 378, a memory 380, and a backhaul or network interface 382.

The RF transceivers 372a, 372b . . . 372n receive an incoming RF signal from antennas 370a, 370b . . . 370n, such as a signal transmitted by UEs or other gNBs. RF transceivers 372a, 372b . . . 372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. RF transceivers 372a, 372b . . . 372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of the gNB 102. For example, the controller/processor 378 can control the reception of forward channel signals and the transmission of backward channel signals through the RF transceivers 372a, 372b . . . 372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. The controller/processor 378 may include at least one microprocessor or microcontroller.

The controller/processor 378 may execute programs and other processes residing in the memory 380, such as a basic OS. The controller/processor 378 can also support channel quality measurement and reporting for systems with 2D antenna arrays as described herein. The controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an AP, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. Apart of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described herein, the transmission and reception paths of the gNB 102 (implemented using RF transceivers 372a-372n, the TX processing circuit 374 and/or the RX processing circuit 376) support aggregated communication with FDD cells and TDD cells.

Although FIG. 3B illustrates an example of the gNB 102, various changes may be made to FIG. 3B. For example, gNB 102 can include any number of each component shown in FIG. 3A. As a specific example, the AP can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

Those skilled in the art will understand that terminal and terminal device as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a personal digital assistant (PDA), which may include an RF receiver, a pager, an internet/intranet access, a web browser, a notepad, a calendar and/or a global positioning system (GPS)) receiver; a conventional laptop and/or palmtop computer or other devices having and/or including an RF receiver. Also, terminal and terminal device as used herein may be portable, transportable, installed in vehicles (aviation, sea transportation and/or land), or suitable and/or configured to operate locally, and/or in distributed form, operate on the earth and/or any other position in space. Terminal and terminal device as used herein may also be a communication terminal, an internet terminal, a music/video playing terminal, such as a PDA, a mobile Internet device (MID) and/or a mobile phone with music/video playing functions, a smart TV, a set-top box and other devices.

The rapid development of information industry, especially the increasing demand from mobile Internet and Internet of things (IoT), brings unprecedented challenges to the future mobile communication technology. According to the report of International Telecommunication Union (ITU) ITU-R M.[IMT.BEYOND 2020. TRAFFIC], it can be predicted that by 2020, compared with 2010 (4G era), the growth of mobile traffic will be nearly one thousand times, and the number of UE connections will also exceed seventeen billion, and the number of connected devices will be even more alarming, with the massive IoT devices gradually infiltrating into the mobile communication network. In order to meet the unprecedented challenges, the communication industry and academia have carried out extensive research on the 5G mobile communication technology to face the 2020s. At present in ITU report ITU-R M.[IMT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3rd generation partnership project (3GPP), the first stage of 5G is already in progress. To support more flexible scheduling, the 3GPP decides to support variable hybrid automatic repeat request-acknowledgement (HARQ-ACK) feedback delay in 5G. In existing LTE systems, a time from reception of downlink data to uplink transmission of HARQ-ACK is fixed. For example, in FDD systems, the delay is four subframes. In TDD systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot; or as another example, a physical downlink shared channel (PDSCH) time unit), the uplink time unit (for example, a physical uplink control channel (PUCCH) time unit) that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios: enhanced mobile broadband (eMBB), massive machine-type communication (mMTC) and ultra-reliable and low-latency communication (URLLC). The eMBB scenario aims to further improve data transmission rate on the basis of the existing mobile broadband service scenario, so as to enhance user experience and pursue ultimate communication experience between people. mMTC and URLLC are, for example, the application scenarios of the IoT, but their respective emphases are different: mMTC being mainly information interaction between people and things, while URLLC mainly reflecting communication requirements between things.

As described above, various services may be provided according to the development of wireless communication systems, so a method for easily providing such services is needed.

To solve at least the above technical problems, embodiments of the disclosure provide a method performed by a terminal, the terminal, a method performed by a base station and the base station in a wireless communication system, and a non-transitory computer-readable storage medium. Hereinafter, various embodiments of the disclosure will be described in detail with reference to the accompanying drawings.

In embodiments of the disclosure, for the convenience of description, a first transceiving node and a second transceiving node are defined. The first transceiving node may be a base station, and the second transceiving node may be a UE. In the following examples, the base station is taken as an example (but not limited thereto) to illustrate the first transceiving node, and the UE is taken as an example (but not limited thereto) to illustrate the second transceiving node.

Figure 4:
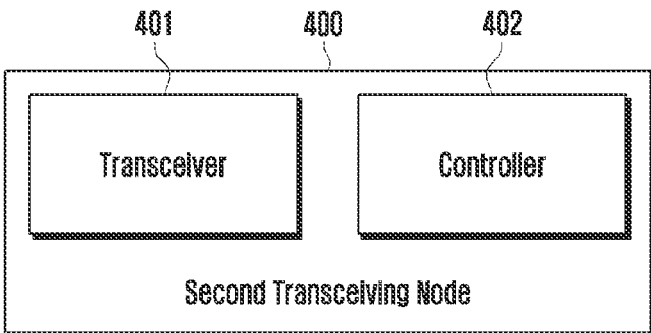
FIG. 4 illustrates a second transceiving node according to an embodiment.

FIG. 4 illustrates a second transceiving node according to an embodiment.

Referring to FIG. 4, the second transceiving node 400 includes a transceiver 401 and a controller 402.

The transceiver 401 may be configured to receive first data and/or first control signaling from the first transceiving node, and transmit second data and/or second control signaling to the first transceiving node in a determined time unit.

The controller 402 may be an application specific integrated circuit (ASIC) or at least one processor. The controller 402 may be configured to control the overall operation of the second transceiving node and control the second transceiving node to implement the methods proposed in the embodiments of the disclosure. The controller 402 may be configured to determine the second data and/or the second control signaling and a time unit for transmitting the second data and/or the second control signaling based on the first data and/or the first control signaling, and control the transceiver 401 to transmit the second data and/or the second control signaling to the first transceiving node in the determined time unit.

The controller 402 may be configured to perform one or more operations in methods of various embodiments, as described below. The controller 402 may be configured to perform one or more of operations in FIG. 5 and/or FIG. 8.

The first data may be data transmitted by the first transceiving node to the second transceiving node. In the following examples, downlink data carried by a PDSCH is taken as an example (but not limited thereto) to illustrate the first data.

The second data may be data transmitted by the second transceiving node to the first transceiving node. In the following examples, uplink data carried by a physical uplink shared channel (PUSCH) is taken as an example to illustrate the second data, but not limited thereto.

The first control signaling may be control signaling transmitted by the first transceiving node to the second transceiving node. In the following examples, downlink control signaling is taken as an example (but not limited thereto) to illustrate the first control signaling. The downlink control signaling may be downlink control information (DCI) carried by a physical downlink control channel (PDCCH) and/or control signaling carried by a PDSCH). For example, the DCI may be UE specific DCI, and the DCI may also be common DCI. The common DCI may be DCI common to a part of a group of UEs, such as group common DCI, and the common DCI may also be DCI that is common to all of the UEs. The DCI may be an uplink DCI (e.g., DCI for scheduling a PUSCH) and/or a downlink DCI (e.g., DCI for scheduling a PDSCH).

The second control signaling may be control signaling transmitted by the second transceiving node to the first transceiving node. In the following examples, uplink control signaling is taken as an example (but is not limited thereto) to illustrate the second control signaling. The uplink control signaling may be uplink control information (UCI) carried by a PUCCH and/or control signaling carried by a PUSCH. A type of UCI may include one or more of: HARQ-ACK information, scheduling request (SR), link recovery request (LRR), channel state information (CSI) (or configured grant (CG) UCI. In certain embodiments, when UCI is carried by a PUCCH, the UCI may be used interchangeably with the PUCCH.

A PUCCH with SR may be a PUCCH with a positive SR and/or a negative SR. The SR may be a positive SR and/or a negative SR.

The CSI may also be Part 1 CSI and/or Part 2 CSI.

A first time unit is a time unit in which the first transceiving node transmits the first data and/or the first control signaling. In the following examples, a downlink time unit or a downlink slot is taken as an example (but not limited thereto) to illustrate the first time unit.

A second time unit is a time unit in which the second transceiving node transmits the second data and/or the second control signaling. In the following examples, an uplink time unit or an uplink slot or a PUCCH slot or a PCell slot or a PUCCH slot on a PCell is taken as an example (but not limited thereto) to illustrate the second time unit. A 'PUCCH slot' may be understood as a PUCCH transmission slot.

The first time unit and the second time unit may be one or more slots, one or more subslots, one or more OFDM symbols, one or more spans, or one or more subframes.

Herein, depending on the network type, BS can refer to any component (or a set of components) configured to provide wireless access to a network, such as a transmission point (TP), a transmission and reception point (TRP), an evolved base station (eNodeB or eNB), a 5G base station (gNB), a macrocell, a femtocell, a WiFi AP, or other wirelessly enabled devices. BSs may provide wireless access in accordance with one or more wireless communication protocols, e.g., 5G 3GPP NR interface/access, LTE, LTE advanced (LTE-A), high speed packet access (HSPA), Wi-Fi 802.11a/b/g/n/ac, etc.

In the wireless communication system described below, higher layer signaling or higher layer signals may be signal transferring methods for transferring information from a BS to a terminal over a downlink data channel of a physical layer or from a terminal to a base station over an uplink data channel of a physical layer, and examples of the signal transferring methods may include signal transferring methods for transferring information via radio resource control (RRC) signaling, packet data convergence protocol (PDCP) signaling, or a medium access control (MAC) control element (MAC CE).

Figure 5:
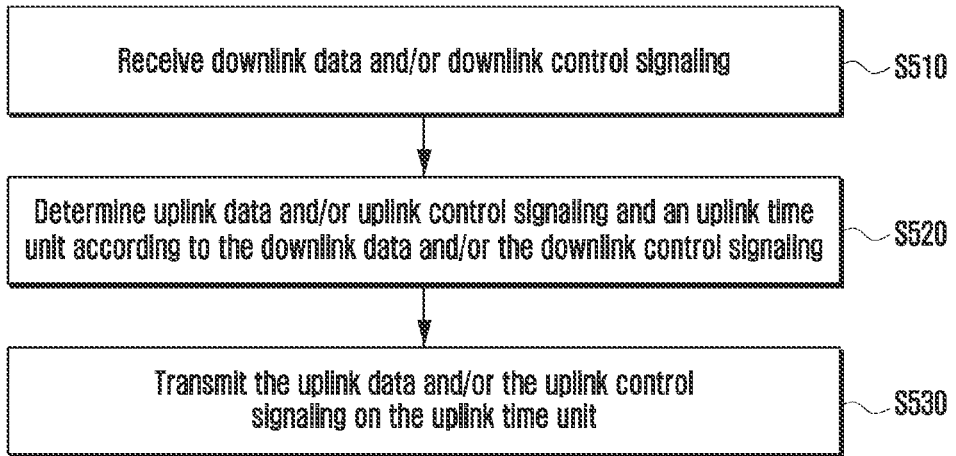
FIG. 5 is a flowchart illustrating a method performed by a UE according to an embodiment.

FIG. 5 is a flowchart illustrating a method performed by a UE according to an embodiment.

Referring to FIG. 5, in step S510, the UE may receive downlink data (e.g., downlink data carried by a PDSCH) and/or downlink control signaling from a base station. For example, the UE may receive the downlink data and/or the downlink control signaling from the base station based on predefined rules and/or received configuration information (e.g., configuration parameters).

In step S520, the UE determines uplink data and/or uplink control signaling and an uplink time unit based on the downlink data and/or downlink control signaling.

In step S530, the UE transmits the uplink data and/or the uplink control signaling to the base station in an uplink time unit.

Acknowledgement/negative acknowledgement (ACK/NACK) for downlink transmissions may be performed through HARQ-ACK.

The downlink control signaling may include DCI carried by a PDCCH and/or control signaling carried by a PDSCH. For example, the DCI may be used to schedule transmission of a PUSCH or reception of a PDSCH. Some examples of uplink transmission timing will be described below with reference to FIGS. 6A-6C, which illustrate examples of uplink transmission timing according to an embodiment.

Figure 6A:
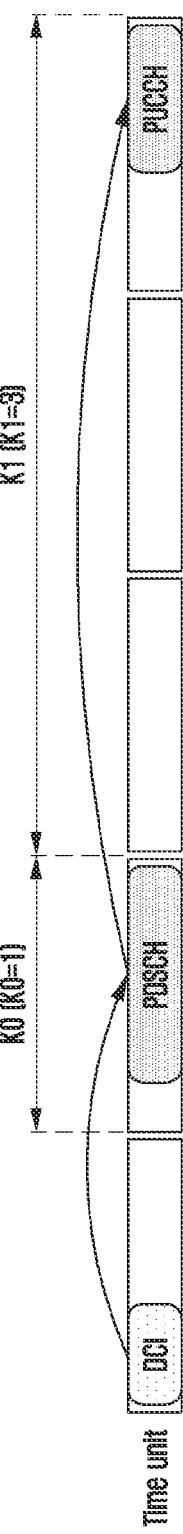
FIGS. 6A-6C illustrate uplink transmission timing according to an embodiment.

In an example, the UE receives the DCI and receives the PDSCH based on time domain resources indicated by the DCI. For example, parameter K0 may be used to represent a time interval between the PDSCH scheduled by the DCI and the PDCCH carrying the DCI, and K0 may be in units of slots. FIG. 6A provides an example in which K0=1. In the example illustrated in FIG. 6A, the time interval from the PDSCH scheduled by the DCI to the PDCCH carrying the DCI is one slot. In embodiments of the disclosure, a UE receives DCI may mean that the UE detects the DCI.

Figure 6B:
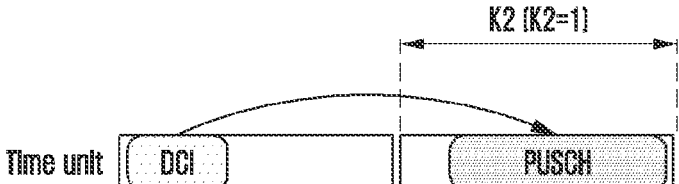

In another example, the UE receives the DCI and transmits the PUSCH based on time domain resources indicated by the DCI. A timing parameter K2 may be used to represent a time interval between the PUSCH scheduled by the DCI and the PDCCH carrying the DCI, and K2 may be in units of slots. FIG. 6B provides an example in which K2=1. In the example illustrated in FIG. 6B, the time interval between the PUSCH scheduled by the DCI and the PDCCH carrying the DCI is one slot. K2 may also represent a time interval between a PDCCH for activating a CG PUSCH and the first activated CG PUSCH. In examples provided herein, unless otherwise specified, the PUSCH may be a PUSCH scheduled by DCI (e.g., dynamic grant (DG) PUSCH) and/or a PUSCH not scheduled by DCI (e.g., CG PUSCH).

In another example, the UE receives the PDSCH, and may transmit HARQ-ACK information for the PDSCH in a PUCCH in the uplink time unit. A timing parameter (which may also be referred to as a timing value) K1 (e.g., parameter dl-DataToUL-ACKin 3GPP) may be used to represent a time interval between the PUCCH for transmitting the HARQ-ACK information for the PDSCH and the PDSCH, and K1 may be in units of uplink time units, such as slots or subslots. In a case where K1 is in units of slots, the time interval is a value of a slot offset between the PUCCH for feeding back the HARQ-ACK information for the PDSCH and the PDSCH, and K1 may be referred to as a slot timing value. FIG. 6A provides an example in which K1=3. In the example illustrated in FIG. 6A, the time interval between the PUCCH for transmitting the HARQ-ACK information for the PDSCH and the PDSCH is 3 slots. It should be noted that in various embodiments, the timing parameter K1 may be used interchangeably with a timing parameter $K_1$, the timing parameter K0 may be used interchangeably with a timing parameter $K_0$, and the timing parameter K2 may be used interchangeably with a timing parameter $K_2$.

In examples provided herein, the PDSCH may be a PDSCH scheduled by the DCI and/or a semi-persistent scheduling (SPS) PDSCH. The UE will periodically receive the SPS PDSCH after the SPS PDSCH is activated by the DCI. As provided herein, the SPS PDSCH may be equivalent to a PDSCH not scheduled by the DCI/PDCCH, or a PDSCH without an associated PDCCH transmission. After the SPS PDSCH is released (deactivated), the UE will no longer receive the SPS PDSCH.

In various embodiments, HARQ-ACK may be HARQ-ACK for an SPS PDSCH reception (e.g., HARQ-ACK not indicated by DCI) and/or HARQ-ACK indicated by a DCI format (e.g., HARQ-ACK for a PDSCH scheduled by a DCI format).

Figure 6C:
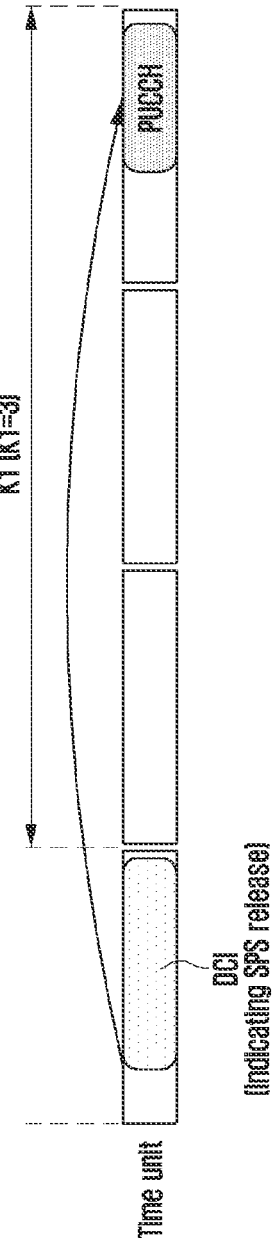

In another example, the UE receives the DCI (e.g., DCI indicating SPS PDSCH release (deactivation)), and may transmit HARQ-ACK information for the DCI in the PUCCH in the uplink time unit. For example, the timing parameter K1 may be used to represent a time interval between the PUCCH for transmitting the HARQ-ACK information for the DCI and the DCI, and K1 may be in units of uplink time units, such as slots or subslots. FIG. 6C provides an example in which K1=3. In the example of FIG. 6C, the time interval between the PUCCH for transmitting the HARQ-ACK information for the DCI and the DCI is 3 slots. For example, the timing parameter K1 may be used to represent a time interval between a PDCCH reception with DCI indicating SPS PDSCH release (deactivation) and the PUCCH feeding back HARQ-ACK for the PDCCH reception.

Alternatively, in step S520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

The base station may configure higher layer signaling for the UE based on a UE capability previously received from the UE (e.g., in the previous downlink-uplink transmission processes of step S510). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

Downlink channels (downlink resources) may include PDCCHs and/or PDSCHs. Uplink channels (uplink resources) may include PUCCHs and/or PUSCHs.

The UE may be configured with two levels of priorities for uplink transmission. For example, the UE may be configured to multiplex UCIs with different priorities by higher layer signaling (e.g., by parameter uci-MuxWithDiffPrio). Otherwise, e.g., when the UE is not configured to multiplex UCIs with different priorities, the UE performs prioritization among PUCCHs and/or PUSCHs with different priorities. For example, the two levels of priorities may include a first priority and a second priority which are different from each other. In an example, the first priority may be higher than the second priority. That is, the first priority is a higher priority, and the second priority is a lower priority. In another example, the first priority may be lower than the second priority. However, embodiments of the disclosure are not limited to this, and for example, the UE may be configured with more than two levels of priorities. For the sake of convenience, description is made considering that the first priority is higher than the second priority. All embodiments of the disclosure are applicable to situations where the first priority may be higher than the second priority. Nonetheless, the embodiments are applicable to situations where the first priority may be lower than the second priority; and are applicable to situations where the first priority may be equal to the second priority.

Multiplexing multiple uplink transmissions (e.g., PUCCHs and/or PUSCHs) overlapping in the time domain may include multiplexing UCI information carried in PUCCHs in a PUCCH or PUSCH.

The UE performing prioritization among two uplink transmissions (e.g., PUCCHs and/or PUSCHs) overlapping in the time domain may include the UE transmitting the uplink transmission (e.g., PUCCH or PUSCH) with a higher priority and not transmitting the uplink transmission (PUCCH or PUSCH) with a lower priority.

The UE may be configured with a subslot-based PUCCH transmission. For example, a subslot length parameter (which may also be referred to as a parameter with respect to a subslot length in embodiments of the disclosure) (e.g., parameter subslotLengthForPUCCH) of each PUCCH configuration parameter of the first PUCCH configuration parameter and the second PUCCH configuration parameter may be seven OFDM symbols, or six OFDM symbols, or two OFDM symbols. Subslot configuration length parameters in different PUCCH configuration parameters may be configured separately. If no subslot length parameter is configured in a PUCCH configuration parameter, the scheduling time unit of this PUCCH configuration parameter is one slot by default. If a subslot length parameter is configured in the PUCCH configuration parameter, the scheduling time unit of this PUCCH configuration parameter is L OFDM symbols. L is the configured subslot configuration length.

The mechanism of slot-based PUCCH transmissions is basically the same as that of subslot-based PUCCH transmissions. In the disclosure, a slot may be used to represent a PUCCH occasion unit. For example, if the UE is configured with subslots, a slot which is a PUCCH occasion unit may be replaced with a subslot. For example, it may be specified by protocols that if the UE is configured with the subslot length parameter (e.g., parameter subslotLengthForPUCCH), unless otherwise indicated, a number of symbols contained in the slot of the PUCCH transmission is indicated by the subslot length parameter.

If the UE is configured with the subslot length parameter, and subslot n is the last uplink subslot overlapping with a PDSCH reception or PDCCH reception (e.g., indicating SPS PDSCH release, and/or indicating secondary cell dormancy (Scell dormancy), and/or triggering a Type-3 HARQ-ACK codebook report and without scheduling a PDSCH reception), then HARQ-ACK information for the PDSCH reception or PDCCH reception is transmitted in an uplink subslot n+k, where k is determined by the timing parameter K1 (the definition of the timing parameter K1 may refer to the previous description). For another example, if the UE is not configured with the subslot length parameter, and slot n is the last uplink slot overlapping with a downlink slot where the PDSCH reception or PDCCH reception is located, then the HARQ-ACK information for the PDSCH reception or PDCCH reception is transmitted in an uplink slot n+k, where K is determined by the timing parameter K1.

Unicast may refer to a manner in which a network communicates with a UE, and multicast may refer to a manner in which a network communicates with multiple UEs. For example, a unicast PDSCH may be a PDSCH received by a UE, and the scrambling of the PDSCH may be based on a radio network temporary identifier (RNTI) specific to the UE, e.g., cell-RNTI (C-RNTI). The unicast PDSCH may also be a unicast SPS PDSCH. A multicast PDSCH may be a PDSCH simultaneously received by more than one UE, and the scrambling of the multicast PDSCH may be based on a UE-group common RNTI. For example, the UE-group common RNTI for scrambling the multicast PDSCH may include an RNTI (also referred to as G-RNTI) for scrambling of a dynamically scheduled multicast transmission (e.g., PDSCH) or an RNTI (referred to as G-CS-RNTI) for scrambling of a multicast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH. UCI(s) of the multicast PDSCH may include HARQ-ACK information for the multicast PDSCH. In embodiments herein, multicast may be replaced with broadcast.

A HARQ-ACK codebook may include HARQ-ACK information for one or more PDSCHs and/or DCI. If the HARQ-ACK information for the one or more PDSCHs and/or DCI is transmitted in a same uplink time unit, the UE may generate the HARQ-ACK codebook based on a predefined rule. If a PDSCH is successfully decoded, the HARQ-ACK information for this PDSCH is a positive ACK. The positive ACK may be represented by 1 in the HARQ-ACK codebook. If a PDSCH is not successfully decoded, the HARQ-ACK information for this PDSCH is a negative ACK (NACK). NACK may be represented by 0 in the HARQ-ACK codebook. The UE may generate the HARQ-ACK codebook based on the pseudo code specified by protocols.

If the UE receives a DCI format that indicates SPS PDSCH release (deactivation), the UE transmits HARQ-ACK information (ACK) for the DCI format. If the UE receives a DCI format that indicates secondary cell dormancy, the UE transmits the HARQ-ACK information (ACK) for the DCI format. In yet another example, if the UE receives a DCI format that indicates to transmit HARQ-ACK information (e.g., a Type-3 HARQ-ACK codebook in 3GPP) of all HARQ-ACK processes of all configured serving cells, the UE transmits the HARQ-ACK information of all HARQ-ACK processes of all configured serving cells. In order to reduce a size of the Type-3 HARQ-ACK codebook, in an enhanced Type-3 HARQ-ACK codebook the UE may transmit HARQ-ACK information of a specific HARQ-ACK process of a specific serving cell based on an indication of the DCI.

In another example, if the UE receives a DCI format that schedules a PDSCH, the UE transmits HARQ-ACK information for the PDSCH. In yet another example, the UE receives an SPS PDSCH, and the UE transmits HARQ-ACK information for the SPS PDSCH reception.

In another example, if the UE is configured by higher layer signaling to receive an SPS PDSCH, the UE transmits HARQ-ACK information for the SPS PDSCH reception. The reception of the SPS PDSCH configured by higher layer signaling may be cancelled by other signaling. In yet another example, if at least one uplink symbol (e.g., OFDM symbol) of the UE in a semi-static frame structure configured by higher layer signaling overlaps with a symbol of an SPS PDSCH reception, the UE does not receive the SPS PDSCH. In yet another example, if the UE is configured by higher layer signaling to receive an SPS PDSCH according to a predefined rule, the UE transmits HARQ-ACK information for the SPS PDSCH reception. It should be noted that in certain embodiments, A overlaps with B may mean that A at least partially overlaps with B. That is, A overlaps with B includes a case where A completely overlaps with B. A overlaps with B may mean that A overlaps with B in then time domain and/or A overlaps with B in frequency domain.

If HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCH receptions, the UE may generate HARQ-ACK information (e.g., HARQ-ACK information only for SPS PDSCH receptions) according to a rule for generating a HARQ-ACK codebook for an SPS PDSCH reception. The UE may multiplex HARQ-ACK information only for SPS PDSCH receptions in a specific PUCCH resource. For example, if the UE is configured with an SPS PUCCH list parameter (e.g., SPS-PUCCH-AN-List), the UE multiplexes the HARQ-ACK information only for SPS PDSCH receptions in a PUCCH resource in the SPS PUCCH list. For example, the UE determines the PUCCH resource in the SPS PUCCH list according to a number of HARQ-ACK bits. If the UE is not configured with the SPS PUCCH list parameter, the UE multiplexes the HARQ-ACK information only for SPS PDSCH receptions in a PUCCH resource specific to SPS HARQ-ACK. For example, the PUCCH resource is configured by parameter n1PUCCH-AN.

If HARQ-ACK information transmitted in a same uplink time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ-ACK codebook (e.g., Type-1 HARQ-ACK codebook) or a dynamic HARQ-ACK codebook (e.g., Type-2 HARQ-ACK codebook in 3GPP) according to a PDSCH HARQ-ACK codebook configuration parameter (e.g., parameter pdsch-HARQ-ACK-Codebook). The dynamic HARQ-ACK codebook may also be an enhanced dynamic HARQ-ACK codebook (e.g., Type-2 HARQ-ACK codebook based on grouping and HARQ-ACK retransmission in 3GPP). The UE may multiplex the HARQ-ACK information in a PUCCH resource, that may be configured in a resource set list parameter (for example, parameter resourceSetToAddModList), for dynamic scheduled HARQ-ACK. The UE determines a PUCCH resource set (e.g., parameter PUCCH-ResourceSet) in the resource set list according to a number of HARQ-ACK bits, and a PUCCH in the PUCCH resource set may be determined as the PUCCH resource according to a PRI (PUCCH resource indicator) field indication in a last DCI format.

If HARQ-ACK information transmitted in a same uplink time unit includes only HARQ-ACK information for an SPS PDSCH (e.g., a PDSCH not scheduled by a DCI format), the UE may generate the HARQ-ACK codebook according to a rule for generating a HARQ-ACK codebook for an SPS PDSCH reception (e.g., the pseudo code for generating a HARQ-ACK codebook for an SPS PDSCH reception defined in 3GPP).

The semi-static HARQ-ACK codebook (e.g., Type-1 HARQ-ACK codebook) may determine the size of the HARQ-ACK codebook and an order of HARQ-ACK bits according to a semi-statically parameter (e.g., a parameter configured by higher layer signaling). For a serving cell c, an active downlink bandwidth part (BWP) and an active uplink BWP, the UE determines a set of $M_{A,c}$ occasions for candidate PDSCH receptions for which the UE can transmit corresponding HARQ-ACK information in a PUCCH in an uplink slot $n_U$.

$M_{A,c}$ may be determined by at least one of:

a) HARQ-ACK slot timing values K1 of the active uplink BWP;

b) a downlink TDRA table;

c) an uplink sub-carrier spacing (SCS) configuration and a downlink SCS configuration;

d) a semi-static uplink and downlink frame structure configuration;

e) a downlink slot offset parameter (e.g., parameter $N_{slot,offset,c}^{DL}$) for the serving cell c and its corresponding SCS parameter (e.g., parameter $\mu_{offset,DL,c}$), and a slot offset parameter (e.g., parameter $N_{slot,offset}^{UL}$) for a primary serving cell and its corresponding SCS parameter (e.g., parameter $\mu_{offset,UL}$).

The parameter K1 is used to determine a candidate uplink slot, and then determine candidate downlink slots according to the candidate uplink slot. The candidate downlink slots satisfy at least one of the following conditions: (i) if the time unit of the PUCCH is a subslot, the end of at least one candidate PDSCH reception in the candidate downlink slots overlaps with the candidate uplink slot in the time domain; or (ii) if the time unit of the PUCCH is a slot, the end of the candidate downlink slots overlap with the candidate uplink slot in the time domain. A starting symbol may be used interchangeably with a starting position, and an end symbol may be used interchangeably with an end position. The starting symbol may be replaced by the end symbol, and/or the end symbol may be replaced by the starting symbol.

A number of PDSCHs in a candidate downlink slot for which HARQ-ACK needs to be fed back may be determined by a maximum value of a number of non-overlapping valid PDSCHs in the downlink slot (e.g., the valid PDSCHs may be PDSCHs that do not overlap with semi-statically configured uplink symbols). Time domain resources occupied by the PDSCHs may be determined by: (i) a TDRA table configured by higher layer signaling (also referred to as a table associated with TDRA); and (ii) a certain row in the TDRA table dynamically indicated by DCI. Each row in the TDRA table defines information with respect to TDRA. For example, for the TDRA table, an indexed row defines a timing value (e.g., time unit (e.g., slot) offset (e.g., K0)) between a PDCCH and a PDSCH, and a start and length indicator (SLIV), or directly defines a starting symbol and allocation length. For example, for the first row of the TDRA table, a start OFDM symbol is 0 and an OFDM symbol length is four; for the second row of the TDRA table, the start OFDM symbol is four and the OFDM symbol length is four; and for the third row of the TDRA table, the start OFDM symbol is seven and the OFDM symbol length is four. The DCI for scheduling the PDSCH may indicate any row in the TDRA table. When all OFDM symbols in the downlink slot are downlink symbols, the maximum value of the number of non-overlapping valid PDSCHs in the downlink slot is two. At this time, the Type-1 HARQ-ACK codebook may need to feed back HARQ-ACK information for two PDSCHs in the downlink slot of the serving cell.

FIGS. 7A and 7B illustrate a TDRA table according to an embodiment. Specifically, FIG. 7A illustrates a TDRA table in which one PDSCH is scheduled by one row, and FIG. 7B illustrates a TDRA table in which multiple PDSCHs are scheduled by one row.

Referring to FIG. 7A, each row corresponds to a value of a timing parameter K0, a value of S indicating a starting symbol, and a value of L indicating a length, where an SLIV may be determined by the value of S and the value of L. Unlike FIG. 7A, in FIG. 7B each row corresponds to values of multiple sets of {K0, S, L}.

The dynamic HARQ-ACK codebook (e.g., Type-2 HARQ-ACK codebook) and/or the enhanced dynamic HARQ-ACK codebook (e.g., Type-2 HARQ-ACK codebook based on grouping and HARQ-ACK retransmission) may determine a size and an order of the HARQ-ACK codebook according to an assignment indicator. For example, the assignment indicator may be a downlink assignment indicator (DAI). The following embodiments, illustrate the assignment indicator as the DAI, for example.

In some implementations, a DAI field includes at least one of a first DAI and a second DAI.

The first DAI may be a counter-DAI (C-DAI). The first DAI indicates an accumulative number of at least one of a DCI scheduling PDSCH(s), a DCI indicating SPS PDSCH release (deactivation), or a DCI indicating secondary cell dormancy. The accumulative number may be an accumulative number up to the current serving cell and/or the current time unit. For example, C-DAI may refer to:

an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy));

an accumulative number of PDCCH(s) up to the current time unit;

an accumulative number of PDSCH transmission(s) up to the current time unit;

an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit;

an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit;

an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit.

The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

The second DAI may be a total-DAI (T-DAI). The second DAI may indicate a total number of at least one of all PDSCH receptions, DCI indicating SPS PDSCH release (deactivation), or DCI indicating secondary cell dormancy. The total number may be a total number of all serving cells up to the current time unit. For example, T-DAI may refer to:

a total number of {serving cell, time unit} pairs scheduled by PDCCH(s) up to the current time unit within a time window (which may also include a number of PDCCHs for indicating SPS release);

a total number of PDSCH transmissions up to the current time unit;

a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit;

a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit;

a total number of PDSCHs (the PDSCHs are PDSCHs with corresponding PDCCHs) already scheduled by the base station up to the current serving cell and/or the current time unit; or a total number of time units with PDSCH transmissions (e.g., the PDSCHs are PDSCHs with corresponding PDCCHs) already scheduled by the base station up to the current serving cell and/or the current time unit.

The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, but the examples are not limited thereto.

Tables 1 and 2, below, show a correspondence between the DAI field and $V_{T\text{-}DAI,m}$ or $V_{C\text{-}DAI,c,m}$. Numbers of bits of the C-DAI and T-DAI are limited.

For example, in a case where the C-DAI or T-DAI is represented with 2 bits, the value of the C-DAI or T-DAI in the DCI may be determined by the equations in Table 1. $V_{T\text{-}DAI,m}$ is the value of the T-DAI in DCI received in a PDCCH Monitoring Occasion (MO) m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,c,m}$ are related to a number of bits of the DAI field in the DCI. In Table 1 below, MSB is the most significant bit and LSB is the least significant bit.

TABLE 1

| MSB, LSB of DAI Field | $V_{T\text{-}DAI,\,m}$ or $V_{C\text{-}DAI,\,c,\,m}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

When the C-DAI or T-DAI is 1, 5 or 9, as shown in Table 1, all of the DAI field are indicated with "00", and the value of $V_{T\text{-}DAI,m}$ or $V_{C\text{-}DAI,c,m}$ is represented as "1" by the equation in Table 1. Y may represent the value of the DAI corresponding to the number of DCIs actually transmitted by the base station (the value of the DAI before conversion by the equation in Table 1).

When the C-DAI or T-DAI in the DCI is 1 bit, values greater than 2 may be represented by equations in Table 2, below.

TABLE 2

| DAI field | $V_{T\text{-}DAI,\,m}$ or $V_{C\text{-}DAI,\,c,\,m}$ | Y |
|---|---|---|
| 0 | 1 | (Y − 1) mod 2 + 1 = 1 |
| 1 | 2 | (Y − 1) mod 2 + 1 = 2 |

Unless the context clearly indicates otherwise, all or one or more of the methods, steps and operations may be specified by protocol and/or configured by higher-level signaling and/or indicated by dynamic signaling. The dynamic signaling may be PDCCH and/or DCI and/or DCI format. For example, SPS PDSCH and/or CG PUSCH may be dynamically indicated in corresponding activated DCI/DCI format/PDCCH.

All or one or more of the described methods, steps and operations may be optional. For example, if a certain parameter (e.g., parameter X) is configured, the UE performs a certain approach (e.g., approach A), otherwise (if the parameter, e.g., parameter X, is not configured), the UE performs another approach (e.g., approach B). Unless otherwise specified, parameters may be higher layer parameters. For example, the higher layer parameters may be parameters configured or indicated by higher layer signaling (e.g., RRC signaling).

A primary cell (PCell) or primary secondary cell (PSCell) may be used interchangeably with a cell having a PUCCH.

Methods for downlink may also be applicable to uplink, and methods for uplink may also be applicable to downlink. A PDSCH may be replaced with a PUSCH, an SPS PDSCH may be replaced with a CG PUSCH, and downlink symbols may be replaced with uplink symbols, so that methods for downlink may be applicable to uplink.

Methods applicable to multiple PDSCHs/PUSCHs scheduling may also be applicable to a PDSCH/PUSCH transmission with repetitions. For example, a PDSCH/PUSCH of multiple PDSCHs/PUSCHs may be replaced by a repetition of multiple repetitions of the PDSCH/PUSCH transmission.

In the disclosure, configured and/or indicated with a transmission with repetitions may be understood that the number of the repetitions of the transmission is greater than 1. For example, configured and/or indicated with a transmission with repetitions may be replaced with PUCCH repeatedly transmitted on more than one slot/sub-slot. Not configured and/or indicated with a transmission with repetitions may be understood that the number of the repetitions of the transmission equals to 1. For example, PUCCH that is not configured and/or indicated with repetitions may be replaced by PUCCH transmission with the number of the repetitions of 1. For example, the UE may be configured with a parameter $N_{PUCCH}^{repeat}$ related to the number of repetitions of PUCCH. When the parameter $N_{PUCCH}^{repeat}$ is greater than 1, the UE is configured with a PUCCH transmission with repetitions, and the UE may repeat the PUCCH transmission on $N_{PUCCH}^{repeat}$ time units (e.g., slots). When the parameter is equal to 1, the UE is not configured with a PUCCH transmission with repetitions. For example, the repeatedly transmitted PUCCH may include only one type of UCI. If the PUCCH is configured with repetitions, a repetition of the multiple repetitions of the PUCCH may be used as a PUCCH (or a PUCCH resource), or all of the repetitions of the PUCCH may be used as a PUCCH (or a PUCCH resource), or a specific repetition of the multiple repetitions of the PUCCH may be used as a PUCCH (or a PUCCH resource).

A PDCCH and/or a DCI and/or a DCI format schedules multiple PDSCHs/PUSCHs, which may be multiple PDSCHs/PUSCHs on a same serving cell and/or multiple PDSCHs/PUSCHs on different serving cells.

Multiple manners described in the disclosure may be combined in any order and, in combination, a manner may be performed one or more times.

Also, steps of methods according to embodiments of the disclosure may be implemented in any order.

Canceling a transmission may mean canceling the transmission of the entire uplink channel and/or cancelling the transmission of a part of the uplink channel.

Ascending order may be replaced by descending order, and/or descending order may be replaced by ascending order.

A PUCCH/PUSCH with A may be understood as a PUCCH/PUSCH only with A, and may also be understood as a PUCCH/PUSCH including at least A.

For a noun, methods of the disclosure may be applicable to one and/or multiple such nouns. The article "a" may also be replaced by "multiple" or "more than one", and "multiple" or "more than one" may also be replaced by "a".

Slot may be replaced by subslot or time unit in certain embodiments.

In certain embodiments, at least one may be understood as one or multiple. In the case of multiple, any permutation and combination of the listed items may be used. For example, at least one of A, B and C may be: A, B, C, AB, BA, ABC, CBA, ABCA, ABCCB, etc.

Certain embodiments may be replaced with other time units.

In certain embodiments, if a predefined condition is met, a predefined method (or step) is performed may be used interchangeably with if the predefined condition is not met, the predefined method (or step) is not performed. If a predefined condition is met, a predefined method (or step) is not performed may be used interchangeably with if the predefined condition is not met, the predefined method (or step) is performed.

In certain embodiments, parameters, information or configurations may be pre-configured or pre-defined or configured by a base station. Therefore, in some cases, parameters, information or configurations may be referred to as predefined parameters, predefined information or predefined configurations, respectively. In certain embodiments, the meaning of pre-configuring certain information or parameters in a UE may be interpreted as default information or parameters being embedded in the UE when the UE is manufactured, or information or parameters being acquired through higher layer signaling (e.g., RRC) and stored in the UE in advance, or information or parameters acquired and stored from a base station.

In certain embodiments, resolving overlapping channels may be understood as resolving collision among overlapping channels and/or resolving collision among a set of overlapping channels. For example, when there is overlap between a PUCCH and a PUSCH, resolving overlap or collision may include multiplexing UCI carried by the PUCCH in the PUSCH, or may include transmitting the PUCCH or PUSCH with a higher priority. For another example, when a PUCCH overlaps with one or another PUCCH, resolving overlap or collision may include multiplexing UCI in a PUCCH, or may include transmitting a PUCCH with a higher priority. For another example, when two PUSCHs in the same serving cell overlap, resolving overlap or collision may include transmitting the PUSCH with a higher priority among the two PUSCHs.

A set of overlapping channels may be understood as each channel of the set of overlapping channels overlapping with at least one of channels in the set other than the channel. The channel may include one or more PUCCHs and/or one or more PUSCHs. For example, a set of overlapping channels may include a set of overlapping PUCCHs and/or PUSCHs. As a specific example, when a first PUCCH overlaps with at least one of a second PUCCH and a third PUCCH, the second PUCCH overlaps with at least one of the first PUCCH and the third PUCCH, and the third PUCCH overlaps with at least one of the first PUCCH and the second PUCCH, the first PUCCH, the second PUCCH and the third PUCCH constitute a set of overlapping channels (e.g., PUCCHs). For example, the first PUCCH overlaps with both the second PUCCH and the third PUCCH, and the second PUCCH does not overlap with the third PUCCH.

In some cases, a PUSCH with a CG (also referred to as a CG PUSCH) or a transmission of the PUSCH may overlap with a PUCCH and/or another PUSCH (e.g., a PUSCH on a same serving cell) in the time domain, or a CG PUSCH may also overlap with a PDSCH scheduled by a DCI/PDCCH (e.g., a PDSCH on a same serving cell). When a CG PUSCH simultaneously collides with other uplink physical channels and/or downlink physical channels in the time domain, how to determine a physical channel to be received and/or a physical channel to be transmitted is a problem to be solved.

When a CG PUSCH simultaneously collides with other uplink physical channels and/or downlink physical channels, at least one of the following Manners MN1 to MN3, MN10 and MN16 may be adopted to determine a physical channel to be received and/or a physical channel to be transmitted.

Collision among a PUSCH and other uplink physical channels and/or downlink physical channels may be at least one of the following:

- The PUSCH overlaps with other PUSCH and/or PUCCH and/or PDSCH and/or PDCCH on a same serving cell in the time domain.
- The PUSCH overlaps with a PUCCH in the time domain. For example, the PUSCH overlaps with a PUCCH on a different serving cell in the time domain, and/or the serving cell does not support simultaneous transmission of the PUSCH and the PUCCH.
- A first PUCCH overlaps with a second PUCCH in the time domain.
- A PUCCH overlaps with a PDSCH on a same serving cell in the time domain.

Manner MN1

In Manner MN1, the physical channel to be received and/or the physical channel to be transmitted may be determined according to one or more of the following steps.

Step 1: resolve collision among downlink physical channels and uplink physical channels. In Step 1, downlink physical channel(s) to be received and/or uplink physical channel(s) to be transmitted may be determined from the downlink physical channels and the uplink physical channels, such that downlink receptions do not collide with uplink transmissions. For example, when a CG PUSCH overlaps with a PDSCH on a same serving cell scheduled by a DCI/PDCCH in the time domain, the UE does not transmit the CG PUSCH if a first predefined condition is satisfied. Alternatively, when a CG PUSCH overlaps with a PDSCH on a same serving cell scheduled by a DCI/PDCCH in the time domain, the UE cancels transmission of specific symbols of the CG PUSCH (e.g., symbols that overlap with the PDSCH in the time domain).

Herein, "downlink receptions do not collide with uplink transmissions" can be understood as physical channels corresponding to the downlink receptions do not collide (e.g., do not overlap) with physical channels corresponding to the uplink transmissions. That is, the UE can receive the downlink physical channel and transmit the uplink physical channel. The statement, "downlink receptions do not collide" can be understood as physical channels corresponding to respective downlink receptions do not collide (e.g., do not overlap), that is, the UE can receive the multiple downlink physical channels. Similarly, "uplink transmissions do not collide" can be understood as physical channels corresponding to respective uplink transmissions do not collide (e.g., do not overlap), that is, the UE can transmit the multiple uplink physical channels.

Step 2: resolve collision among multiple uplink physical channels. In Step 2, uplink physical channel(s) to be transmitted may be determined from the multiple uplink physical channels, such that uplink transmissions do not collide. For example, the uplink physical channel(s) to be transmitted may be determined according to a specified method. For example, if uplink physical channels with different priorities collide, the UE transmits an uplink physical channel with a higher priority, and the UE does not transmit an uplink physical channel with a lower priority. As another example, if a CG PUSCH collides with a DG PUSCH with a same priority, the UE transmits the DG PUSCH. As a further example, if a CG PUSCH collides with a PUCCH with a same priority, the UE multiplexes UCI in the PUCCH in the PUSCH, and the UE transmits the PUSCH, and does not transmit the PUCCH. As an example, the multiple uplink physical channels may include the uplink physical channel(s) to be transmitted determined in Step 1. For example, in Manner MN1, Step 2 may be performed after Step 1.

The first predefined condition may include at least one of the following conditions:

- Condition one (COND1): UE has not reported or indicated a specific UE capability. The specific UE capability may be a capability with respect to partial cancellation of uplink transmission. The specific UE capability may be partial cancellation of uplink transmission (a capability of [partialCancellation]).
- Condition two (COND2): UE has reported or indicated a specific UE capability. The specific UE capability may be the capability with respect to partial cancellation of uplink transmission. The specific UE capability may be partial cancellation of uplink transmission (the capability of [partialCancellation]).
- Condition three (COND3): a time interval between the end (or starting) position (or symbol) of a PDCCH (or a CORESET where a DCI is located) and the starting position (or symbol) (or a specific symbol) of a CG PUSCH is greater than a predefined time.
- Condition four (COND4): a time interval between the end (or starting) position (or symbol) of a PDCCH (or a CORESET where a DCI is located) and a CG PUSCH and the earliest (or all) starting position (or symbol) (or a specific symbol) in a PUCCH and/or a PUSCH that overlaps with the CG PUSCH in the time domain is greater than a predefined time.
- Condition five (COND5): a time interval between the end (or starting) position (or symbol) of a PDCCH (or a CORESET where a DCI is located) and the starting position (or symbol) (or a specific symbol) of an SPS PDSCH is greater than a predefined time.

Condition six (COND6): a time interval between the end (or starting) position (or symbol) of a PDCCH (or a CORESET where a DCI is located) and the earliest (or all) starting position (or symbol) (or a specific symbol) of an SPS PDSCH and PDSCHs that overlap with the SPS PDSCH in the time domain on a same serving cell is greater than a predefined time.

The predefined time may be a PUSCH preparation time for a corresponding PUSCH processing capability, for example, parameter $T_{proc,2}$.

The method can increase the transmission probability of the uplink physical channel and reduce the uplink time delay. For example, when a CG PUSCH with a higher priority simultaneously overlaps with a PUCCH with a lower priority and a PDSCH scheduled by a DCI in the time domain, the transmission probability of the uplink physical channel can be increased.

Manner MN2

In Manner MN2, the physical channel to be received and/or the physical channel to be transmitted may be determined according to one or more of the following steps.

Step 1: resolve collision among multiple uplink physical channels. In Step 1, uplink physical channel(s) to be transmitted may be determined from the multiple uplink physical channels, such that uplink transmissions do not collide. For example, the uplink physical channel(s) to be transmitted may be determined according to a specified method.

Step 2: resolve collision among downlink physical channels and uplink physical channels. In Step 2, downlink physical channel(s) to be received and/or uplink physical channel(s) to be transmitted may be determined from the downlink physical channels and the uplink physical channels, such that downlink reception does not collide with uplink transmissions. For example, when a CG PUSCH overlaps with a PDSCH on a same serving cell scheduled by a DCI/PDCCH in the time domain, the UE does not transmit the CG PUSCH if a first predefined condition is satisfied. Alternatively, when a CG PUSCH overlaps with a PDSCH on a same serving cell scheduled by a DCI/PDCCH in the time domain, the UE cancels transmission of specific symbols of the CG PUSCH (e.g., symbols of the CG PUSCH that overlap with the PDSCH in the time domain). As an example, in Step 2, the multiple uplink physical channels may include the uplink physical channel(s) to be transmitted determined in Step 1. In Manner MN2, Step 2 may be performed after Step 1.

In Manner MN2, if transmission of the CG PUSCH is cancelled in Step 1 (e.g., transmission thereof is cancelled by a CG PUSCH with a higher priority on a same serving cell or a PUCCH with SPS HARQ-ACK and/or SR), the PDCCH scheduling the PDSCH does not need to satisfy a predefined timing condition, so the flexibility of downlink scheduling can be increased and the network spectrum efficiency can be improved.

Manner MN3

In Manner MN3, the physical channel to be received and/or the physical channel to be transmitted may be determined according to one or more of the following steps.

Step 1: resolve collision among multiple downlink physical channels. In Step 1, downlink physical channel(s) to be received may be determined from the multiple downlink physical channels, such that downlink receptions do not collide. The PDSCH(s) to be received may be determined according to a specified method.

Step 2: resolve collision among multiple uplink physical channels. In Step 2, uplink physical channel(s) to be transmitted is determined from the multiple uplink physical channels, such that uplink transmissions do not collide. The PDSCH(s) to be received may be determined according to a specified method.

Step 3: resolve collision among downlink physical channels and uplink physical channels. In Step 3, downlink physical channel(s) to be received and uplink physical channel(s) to be transmitted may be determined from the downlink physical channels and the uplink physical channels, such that downlink receptions and uplink transmissions do not collide. The downlink physical channels may be the physical channel(s) to be received determined in Step 1, and/or the uplink physical channels may be the uplink physical channel(s) to be transmitted determined in Step 2. The downlink physical channel to be finally received and the uplink physical channel to be finally transmitted may be determined from the downlink physical channel(s) to be received determined in Step 1 and the uplink physical channel(s) to be transmitted determined in Step 2, such that downlink receptions and uplink transmissions do not collide.

The order of Step 1 and Step 2 in Manner MN3 may be exchanged. For example, in Manner MN3, Step 3 may be performed after Step 1 and/or Step 2.

The method increases scheduling flexibility and improves network spectrum efficiency.

The embodiments used to resolve simultaneous collision among a CG PUSCH and other uplink physical channels and/or downlink physical channels may also be applied to a PUCCH that is configured by higher layer signaling for transmission, e.g., by replacing CG PUSCH with PUCCH configured by higher layer signaling and/or by replacing other PUSCH on a same serving cell with PUSCH in Manners MN1 to MN3. The PUCCH that is configured by higher layer signaling for transmission may be a PUCCH with HARQ-ACK for an SPS PDSCH reception and/or SR and/or CSI (e.g., the CSI may be periodic CSI).

Manner MN10

In Manner MN10, it may be specified by protocol and/or configured by higher layer signaling that the UE does not expect that an uplink channel simultaneously collides with other uplink channel(s) and downlink channel(s).

For example, the UE does not expect that a CG PUSCH (or PUSCH that is configured by higher layer signaling for transmission) overlaps with a PUCCH and/or another PUSCH on a same serving cell and a PDSCH of the same serving cell scheduled by a PDCCH in the time domain.

For example, the UE does not expect that a PUCCH that is configured by higher layer signaling for transmission simultaneously overlaps with a PUCCH and/or another PUSCH on a same serving cell, and a PDSCH of the same serving cell scheduled by a PDCCH in the time domain.

The method reduces implementation complexity of the UE and the base station.

Manner MN16

In Manner MN16, it may be specified by protocol and/or configured by higher layer signaling that the UE does not expect that a downlink channel simultaneously collides with another downlink channel (or other downlink channels) and an uplink channel (or uplink channels).

For example, the UE does not expect that an SPS PDSCH simultaneously overlaps with one (or multiple) PUSCH(s) or PUCCH(s) on a same serving cell and another PDSCH (or other PDSCHs) on the same serving cell (for example, a PDSCH scheduled by a PDCCH) in the time domain.

The method reduces the implementation complexity of the UE and the base station.

In embodiments of the disclosure, resolving collision among multiple uplink (or downlink) channels may or may not include resolving collision among uplink channels and uplink and downlink frame structures configured by higher layer signaling and/or indicated by dynamic signaling.

In some cases, an SPS PDSCH may overlap with a PDSCH (e.g., PDSCH on a same serving cell) scheduled by a DCI/PDCCH in the time domain, and an SPS PDSCH may also overlap with a PUCCH and/or PUSCH scheduled by a DCI/PDCCH (e.g., PUSCH on a same serving cell) in the time domain. When an SPS PDSCH simultaneously collides with other uplink physical channels and downlink physical channels in the time domain, how to determine a physical channel to be received and/or a physical channel to be transmitted is a problem to be solved.

When an SPS PDSCH simultaneously collides with other uplink physical channels and downlink physical channels in the time domain, at least one of Manners MN4 to MN5 may be adopted to determine a physical channel to be received and/or a physical channel to be transmitted.

A collision among a PDSCH and other uplink physical channels and/or downlink physical channels may be at least one of the following:

(i) The PDSCH overlaps with other PUSCH and/or PUCCH and/or PDSCH and/or PDCCH on a same serving cell in the time domain; and (ii) The PDSCH overlaps with a PUCCH in the time domain.

Manner MN4

In Manner MN4, the physical channel to be received and/or the physical channel to be transmitted may be determined according to one or more of the following steps.

Step 1: resolve collision among downlink physical channels and uplink physical channels. In Step 1, downlink physical channel(s) to be received and/or uplink physical channel(s) to be transmitted may be determined from the downlink physical channels and the uplink physical channels, such that downlink receptions do not collide with uplink transmissions. When an SPS PDSCH overlaps with a PUSCH on a same serving cell scheduled by a DCI/PDCCH in the time domain, the UE does not receive the SPS PDSCH if the first predefined condition described above is satisfied. For another example, when an SPS PDSCH overlaps with a PUCCH scheduled by a DCI/PDCCH in the time domain, the UE does not receive the SPS PDSCH if the first predefined condition described above is satisfied.

Step 2: resolve collision among multiple downlink physical channels. In Step 2, downlink physical channel(s) to be received may be determined from the multiple downlink physical channels, such that downlink receptions do not collide. The multiple downlink physical channels may include the downlink physical channel(s) to be received determined in Step 1. A PDSCH to be received may be determined according to a specified method. In Step 2, the multiple downlink physical channels may include the downlink physical channel(s) to be received determined in Step 1. In Manner MN4, Step 2 may be performed after Step 1.

In Manner MN4, if the UE determines to not receive the SPS PDSCH in Step 1, the PDCCH scheduling the PDSCH does not need to satisfy a predefined timing condition, so the flexibility of downlink scheduling can be increased and the network spectrum efficiency can be improved.

Manner MN5

In Manner MN5, the physical channel to be received and/or the physical channel to be transmitted may be determined according to one or more of the following steps.

Step 1: resolve collision among multiple downlink physical channels. In Step 1, downlink physical channel(s) to be received may be determined from the multiple downlink physical channels, such that downlink receptions do not collide. A PDSCH to be received may be determined according to a specified method.

Step 2: resolve collision among downlink physical channels and uplink physical channels. In Step 2, downlink physical channel(s) to be received and/or uplink physical channel(s) to be transmitted may be determined from the downlink physical channels and the uplink physical channels, such that downlink receptions do not collide with uplink transmissions. When an SPS PDSCH overlaps with a PUSCH on a same serving cell scheduled by a DCI/PDCCH in the time domain, the UE does not receive the SPS PDSCH if the first predefined condition described above is satisfied. When an SPS PDSCH overlaps with a PUCCH scheduled by a DCI/PDCCH in the time domain, the UE does not receive the SPS PDSCH if the first predefined condition described above is satisfied. In Step 2, the multiple downlink physical channels may include the downlink physical channel(s) to be received determined in Step 1. In Manner MN5, Step 2 may be performed after Step 1.

In Manner MN5, if the UE determines to not receive the SPS PDSCH in Step 1, the PDCCH scheduling the PUCCH and/or PUSCH does not need to satisfy a predefined timing condition, so the flexibility of downlink scheduling can be increased, and the network spectrum efficiency can be improved.

In some cases, an SPS PDSCH may overlap with a PDSCH on a same serving cell scheduled by a DCI/PDCCH in the time domain (e.g., overlap with a PDSCH of multiple PDSCHs scheduled by a DCI in the time domain; or as another example, overlap with a repetition of multiple repetitions of a PDSCH transmission scheduled by a DCI in the time domain). In these cases, the following Manners MN6 and/or MN7 may be adopted to determine a PDSCH to be received.

Manner MN6

In Manner MN6, the physical channel to be received and/or the physical channel to be transmitted may be determined according to one or more of the following steps.

Step 1: resolve collision among PDSCHs and uplink symbols and/or flexible symbols configured by higher layer signaling (e.g., 3GPP parameters tdd-UL-DL-ConfigurationCommon and/or tdd-UL-DL-ConfigurationDedicated). In Step 1, PDSCH(s) to be received may be determined such that the PDSCH(s) does(do) not collide with the uplink symbols and/or flexible symbols configured by higher layer signaling (e.g., 3GPP parameters tdd-UL-DL-ConfigurationCommon and/or tdd-UL-DL-ConfigurationDedicated). If a PDSCH overlaps with at least one uplink symbol and/or flexible symbol among uplink symbols and/or flexible symbols configured by higher layer signaling, the UE does not receive the PDSCH.

Step 2: resolve collision among downlink physical channels. In Step 2, downlink physical channel(s) to be received is determined such that downlink receptions do not collide. If an SPS PDSCH overlaps with a PDSCH on a same serving cell scheduled by a DCI/PDCCH in the time domain, and an interval between the last end symbol (position) of the PDCCH and the starting symbol (position) of the SPS PDSCH is greater than a predefined time unit (e.g., 14 symbols), the UE does not receive the SPS PDSCH. The downlink physical channels among which collision is to be resolved in Step 2 may include the PDSCH(s) determined to be received in Step 1. For example, in Manner MN6, Step 2 may be performed after Step 1.

In Manner MN6, if the UE determines to not receive the SPS PDSCH in Step 1, the PDCCH for scheduling the PDSCH does not need to satisfy a predefined timing condition, so the flexibility of downlink scheduling can be increased, and the network spectrum efficiency can be improved.

Manner MN7

In Manner MN7, the physical channel to be received and/or the physical channel to be transmitted may be determined according to one or more of the following steps.

Step 1: resolve collision among PDSCHs and uplink symbols and/or flexible symbols configured by higher layer signaling (e.g., 3GPP parameters tdd-UL-DL-ConfigurationCommon and/or tdd-UL-DL-ConfigurationDedicated). In Step 1, PDSCH(s) to be received may be determined such that the PDSCH(s) does not collide with the uplink symbols and/or flexible symbols (indicated as uplink and/or flexible symbols by higher layer signaling) configured by higher layer signaling (e.g., 3GPP parameters tdd-UL-DL-ConfigurationCommon and/or tdd-UL-DL-ConfigurationDedicated). For example, if a PDSCH overlaps with at least one uplink symbol and/or flexible symbol among the uplink symbols and/or flexible symbols configured by higher layer signaling (at least one symbol among the symbols indicated as uplink and/or flexible symbols by higher layer signaling), the UE does not receive the PDSCH.

Step 2: resolve collision among PDSCHs and indication by dynamic signaling (e.g., DCI format 2_0, which may be used to inform a slot format, and the slot format may include downlink symbols, uplink symbols and flexible symbols). In Step 2, PDSCH(s) to be received may be determined such that the PDSCH(s) does(do) not collide with the indication by dynamic signaling (e.g., DCI format 2_0). For example, if an SPS PDSCH overlaps with at least one uplink symbol and/or flexible symbol among the uplink symbols and/or flexible symbols indicated by dynamic signaling (at least one symbol among the symbols indicated as uplink and/or flexible symbol by dynamic signaling (e.g., DCI format 2_0)), the UE does not receive the PDSCH. For another example, if an SPS PDSCH overlaps with at least one of the flexible symbols configured by higher layer signaling and the UE does not detect a DCI format 2_0, the UE does not receive the PDSCH.

Step 3: resolve collision among downlink physical channels and uplink physical channels. In Step 2, downlink physical channel(s) to be received and/or uplink physical channel(s) to be transmitted may be determined from the downlink physical channels and the uplink physical channels, such that downlink receptions do not collide with uplink transmissions. If an SPS PDSCH overlaps with a PDSCH on a same serving cell scheduled by a DCI/PDCCH in the time domain, and an interval between the last end symbol (position) of the PDCCH and the starting symbol (position) of the SPS PDSCH is greater than a predefined time unit (e.g., fourteen symbols), the UE does not receive the SPS PDSCH. In Step 3, the downlink physical channels among which collision is to be resolved may include the PDSCH(s) determined to be received in Step 1 and/or the PDSCH(s) determined to be received in Step 2.

Steps 1 and 2 in Manner MN7 can be combined into one step.

This method is also applicable to a scenario where a DCI schedules a PDSCH.

In Manner MN7, if the UE determines to not receive the SPS PDSCH in Step 1, the PDCCH for scheduling the PDSCH does not need to satisfy a predefined timing condition, so the flexibility of downlink scheduling can be increased, and the network spectrum efficiency can be improved.

A CG PUSCH may overlap with a PUSCH on a same serving cell scheduled by a DCI/PDCCH in the time domain (e.g., overlap with a PUSCH of multiple PUSCHs scheduled by a DCI in the time domain; as another example, overlap with a repetition of multiple repetitions of a PUSCH transmissions scheduled by a DCI in the time domain). In these cases, the following Manner MN8 and/or Manner MN9 may be adopted to determine the PUSCH to be transmitted.

Manner MN8

In Manner MN8, the physical channel to be received and/or the physical channel to be transmitted may be determined according to one or more of the following steps.

Step 1: resolve collision among PUSCHs and downlink symbols and/or flexible symbols configured by higher layer signaling (e.g., 3GPP parameters tdd-UL-DL-ConfigurationCommon and/or tdd-UL-DL-ConfigurationDedicated). In Step 1, PUSCH(s) to be transmitted may be determined such that the PUSCH(s) does(do) not collide with the downlink symbols configured by higher layer signaling (e.g., 3GPP parameters tdd-UL-DL-ConfigurationCommon and/or tdd-UL-DL-ConfigurationDedicated). If a PUSCH overlaps with at least one downlink symbol and/or flexible symbol among downlink symbols and/or flexible symbols configured by higher layer signaling, the UE does not transmit the PUSCH.

Step 2: resolve collision among uplink physical channels. In Step 2, uplink physical channel(s) to be transmitted is determined such that uplink transmissions do not collide. If a CG PUSCH overlaps with a PUSCH on a same serving cell scheduled by a DCI/PDCCH in the time domain, and an interval between the last end symbol (position) of the PDCCH and the starting symbol (position) of the CG PUSCH is greater than a predefined time unit (e.g., parameter $T_{proc,2}$), the UE does not transmit the CG PUSCH. As an example, the uplink physical channels among which collision is to be resolved in Step 2 may include the PUSCH(s) determined to be transmitted in Step 1. In Manner MN8, Step 2 may be performed after Step 1.

Symbols where a synchronization signal and PBCH block (SSB) are located may be regarded as the downlink symbols configured by higher layer signaling.

In Manner MN8, if the UE determines to not transmit the CG PUSCH in Step 1, the PDCCH scheduling the PUSCH and the CG PUSCH do not need to satisfy a predefined timing condition, so the flexibility of uplink scheduling can be increased and the network spectrum efficiency can be improved.

Manner MN9

In Manner MN9, the physical channel to be received and/or the physical channel to be transmitted may be determined according to one or more of the following steps.

Step 1: resolve collision among PUSCHs and downlink symbols and/or flexible symbols configured by higher layer signaling (e.g., 3GPP parameters tdd-UL-DL-ConfigurationCommon and/or tdd-UL-DL-ConfigurationDedicated). In Step 1, PUSCH(s) to be transmitted may be determined such that the PUSCH(s) does(do) not collide with the downlink symbols and/or flexible symbols configured by higher layer signaling (e.g., 3GPP parameters tdd-UL-DL-ConfigurationCommon and/or tdd-UL-DL-ConfigurationDedicated). If a PUSCH overlaps with at least one downlink symbol and/or flexible symbol among downlink symbols and/or flexible symbols configured by higher layer signaling, the UE does not transmit the PUSCH.

Step 2: resolve collision among PUSCHs and indication by dynamic signaling (e.g., DCI format 2_0, which may be used to inform a slot format, and the slot format may include downlink symbols, uplink symbols and flexible symbols). In Step 2, PUSCH(s) to be transmitted may be determined such that the PUSCH(s) does(do) not collide with the indication by dynamic signaling (e.g., DCI format 2_0). If a CG PUSCH overlaps with at least one downlink symbol and/or flexible symbol among the downlink symbols and/or flexible symbols indicated by the dynamic signaling, the UE does not transmit the PUSCH. If a CG PUSCH overlaps with at least one of the flexible symbols configured by higher layer signaling and the UE does not detect the DCI format 20, the UE does not transmit the PUSCH.

Step 3: resolve collision among downlink physical channels and uplink physical channels. In Step 2, downlink physical channel(s) to be received and/or uplink physical channel(s) to be transmitted may be determined from the downlink physical channels and the uplink physical channels, such that downlink receptions do not collide with uplink transmissions. If a CG PUSCH overlaps with a PUSCH on a same serving cell scheduled by a DCI/PDCCH in the time domain, and an interval between the last end symbol (position) of the PDCCH and the starting symbol (position) of the CG PUSCH is greater than a predefined time unit (e.g., 14 symbols), the UE does not transmit the CG PUSCH. In step 3, the physical channels among which collision is to be resolved may include the PUSCH(s) determined to be transmitted in Step 1 and/or the PUSCH(s) determined to be transmitted in Step 2.

Steps 1 and 2 in Manner MN9 can be combined into one step.

This method is also applicable to a scenario where a DCI schedules a PUSCH.

In Manner MN9, if the UE determines to not transmit the CG PUSCH in Step 1, the PDCCH scheduling the PUSCH does not need to satisfy a predefined timing condition, so the flexibility of uplink scheduling can be increased and the network spectrum efficiency can be improved.

In some cases, to resolve collision (or overlapping) among uplink physical channels and downlink physical channels, Manner MN12 may be adopted.

Manner MN12

Step 1: resolve collision among multiple downlink physical channels, and collision among downlink physical channels and uplink symbols and/or flexible symbols configured by higher layer signaling (e.g., 3GPP parameters tdd-UL-DL-ConfigurationCommon and/or tdd-UL-DL-ConfigurationDedicated), and/or collision among downlink physical channels and dynamic signaling (e.g., DCI format 2_0, which may be used to inform a slot format, and the slot format may include downlink symbols, uplink symbols and flexible symbols). For example, physical downlink channels that can be received are determined under an assumption that there is no uplink physical channel transmission. For example, it can be resolved according to the methods of other embodiments of the present disclosure.

Step 2: resolve collision among multiple uplink physical channels, and collision among uplink physical channels and downlink symbols and/or flexible symbols configured by higher layer signaling (e.g., 3GPP parameters tdd-UL-DL-ConfigurationCommon and/or tdd-UL-DL-ConfigurationDedicated), and/or collision among uplink physical channels and dynamic signaling (e.g., DCI format 2_0, which may be used to inform a slot format, and the slot format may include downlink symbols, uplink symbols and flexible symbols). For example, physical uplink channels that can be transmitted are determined under an assumption that there is no downlink physical channel transmission. For example, it can be resolved according to the methods of other embodiments of the present disclosure.

The order of Step 1 and Step 2 in Manner MN12 may be exchanged.

Step 3: resolve collision among downlink physical channels and uplink physical channels. For example, it can be resolved according to the methods of other embodiments of the present disclosure.

For an operation on a single carrier in unpaired spectrum, if the UE is configured by higher layer to receive a PDCCH, or a PDSCH, or a CSI-RS, or a DL PRS in a set of symbols of a slot, the UE receives the PDCCH, the PDSCH, the CSI-RS, or the DL-PRS if the UE does not detect a DCI format that indicates to the UE to transmit a PUSCH, a PUCCH, a PRACH or a SRS that does not overlap with downlink symbols configured by higher layer signaling (e.g., 3GPP parameters tdd-UL-DL-ConfigurationCommon and/or tdd-UL-DL-ConfigurationDedicated) in at least one symbol of the set of symbols of the slot; otherwise, the UE does not receive the PDCCH, the PDSCH, the CSI-RS, or the DL PRS in the set of symbols of the slot.

For an operation on a single carrier in an unpaired spectrum, if the UE is configured by higher layer to transmit a SRS, or a PUCCH, or a PUSCH, or a PRACH in a set of symbols of a slot, and the UE detects a DCI format that indicates to the UE to receive CSI-RS or PDSCH that does not overlap with uplink symbols configured by higher layer signaling (e.g., 3GPP parameters tdd-UL-DL-ConfigurationCommon and/or tdd-UL-DL-ConfigurationDedicated) in at least one symbol or a subset of the set of symbols of the slot, the UE cancels the transmission of the SRS, or the PUCCH, or the PUSCH, or the PRACH when a timing condition is satisfied.

This method can first determine physical channels that can be transmitted and received according to uplink and downlink frame structures indicated by higher layer signaling and/or dynamic signaling, and then resolve collision among physical channels, so that the probability of physical channel transmission and/or reception can be improved, thereby improving the spectrum efficiency of the system.

Collision among two physical channels can be understood as that the two physical channels cannot be transmitted and/or received at the same time. Collision among a physical channel and higher layer signaling can be understood as that the physical channel cannot be transmitted or received.

For a PUCCH transmission configured with repetitions, the UE first determines the slots with the PUCCH transmission according to uplink symbols and/or flexible symbols configured by higher layer signaling, and then resolves collision among the PUCCH transmission configured with repetitions and other uplink channels or downlink channels.

Determine to receive or determine to be received may be replaced by receive or received, and determine to transmit or determine to be transmitted may be replaced by transmit or transmitted.

The method applicable to CG PUSCH (or PUSCH without PDCCH/DCI scheduling) in embodiments is also applicable to PUSCH with semi-persistent CSI (SP-CSI) (for example, PUSCH with SP-CSI without PDCCH scheduling). For example, CG PUSCH in the embodiments may be replaced with PUSCH with SP-CSI (semi-persistent CSI) (for example, PUSCH with SP-CSI without PDCCH scheduling).

In some cases, the UE may be configured to be able to receive multiple PDSCHs scheduled by a DCI on a serving cell (e.g., a row in a TDRA table contains multiple SLIVs).

If the UE is configured with PDSCH bundling (e.g., the UE is configured with PDSCH time domain bundling; for example, it may be configured by the parameter enable TimeDomainHARQ-Bundling), the UE only generates HARQ-ACK information for a PDSCH candidate position corresponding to the last SLIV of the multiple SLIVs in a row of the TDRA table, and generates NACK for PDSCH candidate positions corresponding to the non-last SLIVs. If HARQ-ACK is transmitted on PUCCH and coded by RM (reed muller), when calculating the power control parameter $n_{HARQ-ACK}$, only the last PDSCH and/or TBs in the last PDSCH indicated by a DCI format may be counted. That is, the last PDSCH and/or TBs in the last PDSCH indicated by the DCI format are considered as the PDSCH and/or TBs received by the UE. For the non-last PDSCHs and/or TBs in the non-last PDSCHs indicated by the DCI format, the UE considers that the PDSCHs and/or TBs are not received. In an example, the UE is configured with a semi-static HARQ-ACK codebook. When a DCI format schedules multiple PDSCHs on a serving cell, the UE can determine the HARQ-ACK codebook according to pseudo code-1, which is set forth below.

PSEUDO CODE-1

```
Set M_{A,c} defines M_c occasions for PDSCH reception for serving cell c
Set c = 0 - serving cell index
Set j = 0- HARQ-ACK information bit index
Set N^{DL}_{cells} to the number of serving cells configured by higher layer signaling for the UE
while c < N^{DL}_{cells}
    Set m = 0 index of occasion for candidate PDSCH reception
    while m < M_c
        if a time domain HARQ bundling enabling parameter (e.g., parameter
        enableTimeDomainHARQ-Bundling) is configured for serving cell c and a PDSCH
        associated with occasion m is scheduled by a DCI format indicating a TDRA row
        that includes more than one SLIV
            if harq-ACK-SpatialBundlingPUCCHis not configured and the UE is configured
            (e.g., by parameter maxNrojCodeWordsScheduledByDCP) with reception of two
            transport blocks for the active DL BWP of serving cell c
                if time domain resources of the PDSCH is determined by the last SLIV in
                the row (e.g., Row r)
                    õ^{ack}_j = binary AND operation of the HARQ-ACK information bits
                    corresponding to (all) first transport blocks in PDSCH receptions, that
                    do not overlap with an uplink symbol indicated by higher layer signaling
                    (e.g., parameter tdd-UL-DL-ConfigurationCommon or tdd-UL-DL-
                    ConfigurationDedicated), on serving cell c;
                    j = j + v
                    õ^{ack}_j = binary AND operation of the HARQ-ACK information bits
                    corresponding to (all) second transport blocks in PDSCH receptions,
                    that do not overlap with an uplink symbol indicated by higher layer
                    signaling (e.g., parameter tdd-UL-DL-ConfigurationCommon or tdd-
                    UL-DL-ConfigurationDedicated), on serving cell c;
                else
                    õ^{ack}_j = NACK;
                    j = j + 1;
                    õ^{ack}_j = NACK;
                end if
                j = j + 1;
            elseif harq-ACK-SpatialBundlingPUCCH is configured and the UE is
            configured (e.g., by parameter maxNrofCodeWordsScheduledByDCI) with
            reception of two transport blocks for the active DL BWP of serving cell c
                if time domain resources of the PDSCH is determined by the last SLIV in
                the row (e.g., Row r)
                    õ^{ack}_j = binary AND operation of the HARQ-ACK information bits
                    corresponding to (all) transport blocks in PDSCHs, that do not overlap
                    with an uplink symbol and/or flexible symbol indicated by higher layer
                    signaling (e.g., parameter tdd-UL-DL-ConfigurationCommon or tdd-
                    UL-DL-ConfigurationDedicated), of serving cell c, if one PDSCH
                    received by the UE contains only one transport block, the UE assumes
                    ACK for the second transport block;
                else
                    õ^{ack}_j = NACK;
                end if
                j = j + 1;
            else
                if time domain resources of the PDSCH is determined by the last SLIV in
                the row (e.g., Row r)
                    õ^{ack}_j = binary AND operation of the HARQ-ACK information bits
                    corresponding to (all) transport blocks in PDSCHs, that do not overlap
                    with an uplink symbol and/or flexible symbol indicated by higher layer
                    signaling (e.g., the parameter tdd-UL-DL-ConfigurationCommon or
                    tdd-UL-DL-ConfigurationDedicated), on serving cell c
                else
                    õ^{ack}_j = NACK;
                end if
                j = j + 1;
```

PSEUDO CODE-1-continued

```
      end if
    end if
  end while
  c = c + 1;
end while
```

If $O_{ACK}+O_{SR}+O_{CSI}\leq11$, the UE determines a number of HARQ-ACK information bits $n_{HARQ-ACK}$ for obtaining a transmission power for a PUCCH as $$n_{HARQ-ACK} = \sum_{c=0}^{N_{cells}^{DL}-1}\sum_{m=0}^{M_c-1} N_{m,c}^{recieved} + \sum_{c=0}^{N_{cells}^{DL}-1}\sum_{m=0}^{M_c-1} N_{m,c}^{recieved,CBG}$$

where $N_{cells}^{DL}$ are all DL serving cells (e.g., containing unicast and multicast PDSCHs)

$M_c$ is the cardinality for $M_{A,c}$ (e.g., the union of all sets of occasions for unicast and multicast PDSCH receptions)

$N_{m,c}^{recieved}$ is the number of transport blocks (TBs) the UE receives in PDSCH reception occasion m if harq-ACK-SpatialBundlingPUCCH and PDSCH-Code-BlockGroupTransmission are not configured, or the number of transport blocks the UE receives in PDSCH reception occasion m if PDSCH-CodeBlockGroup-Transmission is configured and the PDSCH reception is scheduled by a DCI format that does not support CBG-based PDSCH receptions, or the number of PDSCH receptions if harq-ACK-SpatialBundling-PUCCH is provided or SPS PDSCH release or TCI state update in PDSCH reception occasion m and the UE reports corresponding HARQ-ACK information in the PUCCH.

If time domain PDSCH bundling (e.g., the 3GPP parameter enableTimeDomainHARQ-Bundling) is configured for serving cell c and for a DCI format indicating a TDRA row that includes more than one SLIV on the serving cell c, the UE considers as received only a PDSCH associated with the last SLIV and/or TBs in the PDSCH associated with the last SLIV, and considers as not received PDSCHs other than the PDSCH associated with the last SLIV and/or TBs in the PDSCHs.

$N_{m,c}^{recieved,CBG}$ is the number of CBGs in the PDSCH the UE receives in a PDSCH reception occasion m if harq-ACK-PDSCH-CodeBlockGroupTransmission is configured and the PDSCH reception is scheduled by a DCI format that supports CBG-based PDSCH receptions and the UE reports corresponding HARQ-ACK information in the PUCCH.

As described above, when the UE is configured to be able to receive multiple PDSCHs scheduled by a DCI on a serving cell, e.g., a DCI format indicating a TDRA row including more than one SLIV, if the serving cell is configured with PDSCH time domain bundling, the UE performs the uplink transmission, such as determining HARQ-ACK information and/or determining a power for uplink trans-mission, based on a PDSCH associated with the last SLIV The method reduces the transmission power of UE and the interference to other channels.

In some cases, the UE may be configured with two levels of priorities for uplink transmission. The UE may be con-figured by higher layer signaling (e.g., configured by param-eter uci-MuxWithDiffPrio) that it may multiplex UCIs with different priorities. If a PUCCH with HARQ-ACK with a higher priority and negative SR overlaps with a PUCCH or PUSCH with a lower priority in the time domain, how to resolve collision among the overlapping PUCCH/PUSCHs is a problem.

Manner MN11

In some implementations, if a PUCCH with HARQ-ACK and a negative SR of the higher priority overlaps with a PUSCH of the lower priority in the time domain, the UE multiplexes the HARQ-ACK with the higher priority in the PUSCH with the lower priority for transmission.

In this method, the UE does not need to transmit infor-mation of the negative SR, and the method is simple to implement, which reduces the implementation complexity of the UE and the base station.

Manner MN13

If the UE is configured with an SPS HARQ deferral parameter (e.g., parameter spsHARQdeferral), after resolv-ing collision among PUCCHs and PUSCHs in a first slot, the UE determines a PUCCH resource for a PUCCH transmis-sion with first HARQ-ACK information bits for SPS PDSCH receptions that the UE would report for a first time, and the PUCCH resource:

is provided by SPS-PUCCH-AN-List, or provided by niPUCCH-AN when SPS-PUCCH-AN-List is not con-figured.

is not cancelled by a PUCCH or PUSCH transmission with a higher priority that overlaps in the time domain.

is not cancelled by a PDSCH reception scheduled by a DCI format that overlaps in the time domain, for example, the PDSCH is in a same serving cell as this PUCCH resource.

overlaps with symbols indicated as downlink by higher layer signaling (e.g., 3GPP tdd-UL-DL-Configuration-Common and/or tdd-UL-DL-ConfigurationDedicated).

the UE may determine an earliest second slot, where the UE multiplexes HARQ-ACK information bits (e.g., the HARQ-ACK information bits include second HARQ-ACK information bits from the first HARQ-ACK infor-mation bits) in a PUCCH or PUSCH in the earliest second slot. If the UE multiplexes the second HARQ-ACK information in a PUCCH, which is provided by SPS-PUCCH-AN-List or is provided by n1PUCCH-AN when SPS-PUCCH-AN-List is not configured, and is cancelled by a PDSCH reception scheduled by a DCI format that overlaps in the time domain (for example, the PDSCH is in a same serving cell as the PUCCH resource; or as another example, the PDSCH does not overlap with uplink symbols configured by higher layer signaling (e.g., 3GPP tdd-UL-DL-ConfigurationCom-mon and/or tdd-UL-DL-ConfigurationDedicated) in the time domain), the UE stops the procedure to deter-mine the earliest second slot in this slot.

This method can determine whether the UE defers the transmission of SPS HARQ-ACK when a PUCCH and a PDSCH scheduled by DCI overlap in the time domain, and can improve the reliability of uplink transmission.

The UE may be configured with two levels of priorities for uplink (e.g., PUCCH) transmission (e.g., the UE is configured with parameter PUCCH-ConfigurationList). The UE is configured to be able to multiplex UCIs with different priorities by higher layer signaling (for example, parameter uci-MuxWithDiffPrio). The UE may multiplex HARQ-ACK information bits of different priorities (for example, priority 0 and priority 1) in a PUCCH. How to determine the PUCCH transmission power is a problem to be solved. It may be determined by Manners MN14 or MN15.

Manner MN14

If the UE transmits a PUCCH that includes HARQ-ACK information bits of different priorities (for example, priority 0 and priority 1) using a PUCCH resource that includes PUCCH formats 2, 3 or 4, the UE determines the PUCCH transmission power assuming that the PUCCH includes only UCI bits of a higher priority (priority 1), where $N_{RE}(i)=\min$ $(M_{RB}^{PUCCH} \cdot N_{sc,ctrl}^{RB} \cdot N_{symb-UCI}^{PUCCH} \lceil (O_{UCI,1}+O_{CRC,1})/(Q_m \cdot r_1) \rceil)$, where $N_{RE}(i)$ is a number of resource elements (REs) for UCI transmission, $M_{RB}^{PUCCH}$ is the transmission bandwidth for the PUCCH and in unit of resource blocks (RBs), $N_{sc,ctrl}^{RB}$ is a number of subcarriers per RB excluding subcarriers used for a demodulation reference signal (DMRS), and $N_{symb-UCI}^{PUCCH}$ is a number of OFDM symbols excluding OFDM symbols used for DMRS. $O_{UCI,1}$ is a number of UCI bits of priority 1, $O_{CRC,1}$ is a number of CRC bits of priority 1, $Q_m$ is a modulation order, and $r_1$ is a code rate of UCI of priority 1. If $O_{UCI} \leq 11$ bits, $O_{UCI,1}= n_{HARQ-ACK,1}+O_{SR,1}$; otherwise, $O_{UCI,1}=O_{ACK,1}+O_{SR,1}$. Herein, $O_{UCI}$ is a number of UCI bits of priority 0 and priority 1, $n_{HARQ-ACK,1}$ is a number of HARQ-ACK information bits of the higher priority for power control (for example, RM (reed-muller) code based power control), and $O_{SR,1}$ is a number of SR information bits of the higher priority. $O_{ACK,1}$ is a number of HARQ-ACK information bits of the higher priority.

If the UE transmit a PUCCH on activated uplink BWP b of carrier f in primary serving cell c using PUCCH power control adjustment state with index l, the UE determines the PUCCH transmission power $P_{PUCCH,b,f,c}$ $(i,q_u,q_d,l)$ in PUCCH transmission occasion i as Equation (1), below:

$$P_{PUCCH,b,f,c}(i, q_u, q_d, l) = $$
$$\min\left\{ \begin{array}{c} P_{CMAX,f,c}(i), \\ P_{O\_PUCCH,b,f,c}(q_u) + 10\log_{10}(2^\mu \cdot M_{RB,b,f,c}^{PUCCH}(i)) + PL_{b,f,c}(q_d) + \\ \Delta_{F\_PUCCH}(F) + \Delta_{TF,b,f,c}(i) + g_{b,f,c}(i, l) \end{array} \right\}$$

$$\text{[dBm (decibel milliwatt)]}$$

(1)

In the above Equation (1):

$P_{CMAX, f,c}(i)$ is the configured maximum output power for carrier f of primary serving cell c in PUCCH transmission occasion i.

$P_{O\_PUCCH,b,f,c}(q_u)$ is an open-loop power parameter.

$M_{RB,b,f,c}^{PUCCH}(i)$ is a transmission bandwidth of the PUCCH in PUCCH transmission occasion i on activated uplink BWP b of carrier f of primary serving cell c, in unit of RBs. It should be noted that a subcarrier spacing of BWP b is μ.

$PL_{b,f,c}(q_d)$ is a parameter related to pathloss.

$\Delta_{F\_PUCCH}(F)$ is a parameter related to PUCCH format.

$g_{b,f,c}(i,l)$ is a closed-loop power parameter.

$\Delta_{TF,b,f,c}(i)$ is a PUCCH transmission power adjustment parameter for PUCCH transmission occasion i on activated uplink BWP b of carrier f of primary serving cell c, for PUCCH format 2, and/or PUCCH format 3 and/or PUCCH format 4, and a number of UCI bits (for example, UCIs of the lower priority and the higher priority) is less than or equal to 11, $\Delta_{TF,b,f,c}$ (i) 10 $\log_{10}(K_1 \cdot (n_{HARQ-ACK}(i)+O_{SR}( )+O_{CSI}(i))/N_{RE}(i))$, where:

$K_1=6$ $n_{HARQ-ACK}(i)$ is a number of HARQ-ACK information bits used for power control. For example, $n_{HARQ-ACK}$ (i) may be a number of HARQ-ACK information bits of the higher priority for power control.

$O_{SR}(i)$ is a number of SR information bits. For example, $O_{SR}(i)$ may be a number of SR information bits of the higher priority.

$O_{CSI}(i)$ is a number of CSI information bits. For example, the number of CSI information bits of the higher priority may be 0.

$N_{RE}(i)$ is a number of REs for UCI transmission. For example, $N_{RE}(i)=\min(M_{RB}^{PUCCH} \cdot N_{sc,ctrl}^{RB} \cdot N_{symb-UCI}^{PUCCH}, \lceil (O_{UCI,1}+O_{CRC,1})/(Q_m \cdot r_1) \rceil)$, where $N_{sc,ctrl}^{RB}(i)$ is a number of subcarriers per RB excluding subcarriers used for DMRS, and $N_{symb-UCI}^{PUCCH}$ is a number of OFDM symbols excluding OFDM symbols used for DMRS. $O_{UCI,1}$ is a number of UCI bits of priority 1, $O_{CRC,1}$ is a number (e.g., 0) of CRC bits of priority 1, $Q_m$ is a modulation order, and $r_1$ is a code rate of UCI of priority 1.

For PUCCH format 2, and/or PUCCH format 3 and/or PUCCH format 4, and a number of UCI bits (for example, UCIs of the lower priority and the higher priority) is greater than 11, $\Delta_{TF,b,f,c}$ (i)=10 $\log_{10} (2^{K_2 \cdot BPRE(i)}-1)$ where:

$K_2=2.4$ $BPRE(i)=(O_{ACK}(i)+O_{SR}(i)+O_{CSI}(i)+O_{CRC}$ (i))/$N_{RE}$ (i)

$O_{ACK}(i)$ is a number of HARQ-ACK information bits. For example, $O_{ACK}$ (i) may be a number of HARQ-ACK information bits of the higher priority.

$O_{SR}$ (i) is a number of SR information bits, for example, $O_{SR}(i)$ may be a number of SR information bits of the higher priority.

$O_{CSI}(i)$ is a number of CSI information bits. For example, the number of CSI information bits of the higher priority may be 0.

$N_{RE}(i)$ is a number of REs for UCI transmission. For example, $N_{RE}$ (i) $\min(M_{RB}^{PUCCH} \cdot N_{sc,ctrl}^{RB} \cdot N_{symb-UCI}^{PUCCH}, \lceil (O_{UCI,1}+O_{CRC,1})/(Q_m \cdot r_1) \rceil)$, where $N_{sc,ctrl}^{RB}(i)$ is a number of subcarriers per RB excluding subcarriers used for DMRS (Demodulation Reference Signal), and $N_{symb-UCI}^{PUCCH}$ is a number of OFDM symbols excluding OFDM symbols used for DMRS. $O_{UCI,1}$ is a number of UCI bits of priority 1, $O_{CRC,1}$ is a number of CRC bits of priority 1, $Q_m$ is a modulation order, and $r_1$ is a code rate of UCI of priority 1.

The method improves the reliability of uplink transmission and avoids the situation where PUCCH transmission power is too large or too small.

Manner MN15

If the UE transmits a PUCCH that includes HARQ-ACK information bits of different priorities (e.g., priority 0 and priority 1) using a PUCCH resource that includes PUCCH formats 2, 3 or 4, the UE determines the PUCCH transmission power assuming that the PUCCH includes only UCI bits of the higher priority (priority 1), where $N_{RE}$ (i)=min $(M_{RB}^{PUCCH} \cdot N_{sc,ctrl}^{RB} \cdot N_{symb-UCI}^{PUCCH}, \lceil (O_{UCI,1}+O_{CRC,1})/ (Q_m \cdot r_1) \rceil)$, where $N_{RE}$(i) is a number of REs for UCI transmission, $M_{RB}^{PUCCH}$ is a transmission bandwidth for PUCCH and in unit of RBs, $N_{sc,ctrl}^{RB}$ is a number of subcarriers per RB excluding subcarriers used for DMRS, and $N_{symb-UCI}^{PUCCH}$ is a number of OFDM symbols excluding OFDM symbols used for DMRS. $O_{UCI-1}$ is a number of UCI bits of priority 1, $O_{CRC,1}$ is a number of CRC bits of priority 1, $Q_m$ is a modulation order, and $r_1$ is a code rate of UCI of priority 1. If $2 < O_{UCI,1} \le 11$ or $3 < O_{UCI,1} \le 11$ bits, $O_{UCI,1}=n_{HARQ-ACK,1}+O_{SR,1}$; otherwise, $O_{UCI,1}=O_{ACK,1}+O_{SR,1}$. Herein, $O_{UCI,1}$ is a number of UCI bits of priority 1, $n_{HARQ-ACK,1}$ is a number of HARQ-ACK information bits of the higher priority for power control (for example, RM (reed-muller) code based power control), and $O_{SR,1}$ is a number of SR information bits of the higher priority. $O_{ACK,1}$ is a number of HARQ-ACK information bits of the higher priority.

In some examples, if the UE transmit a PUCCH on activated uplink BWP b of carrier f in primary serving cell c using PUCCH power control adjustment state with index l, the UE determines the PUCCH transmission power $P_{PUCCH,b,f,c}(i,q_u,q_d,l)$ in PUCCH transmission occasion i as Equation (2), below:

$$P_{PUCCH,b,f,c}(i, q_u, q_d, l) =$$

$$\min \left\{ \begin{array}{l} P_{CMAX,f,c}(i), \\ P_{O\_PUCCH,b,f,c}(q_u) + 10\log_{10}\left(2^{\mu} \cdot M_{RBb,f,c}^{PUCCH}(i)\right) + \\ PL_{b,f,c}(q_d) + \Delta_{F\_PUCCH}(F) + \Delta_{TF,b,f,c}(i) + g_{b,f,c}(i, l) \end{array} \right\} \quad (2)$$

[dBm (decibel milliwatt)]

In the above Equation (2):

$P_{CMAX,f,c}(i)$ is the configured maximum output power for carrier f of primary serving cell c in PUCCH transmission occasion i.

$P_{O\_PUCCH,b,f,c}(q_u)$ is an open-loop power parameter.

$M_{RB,b,f,c}^{PUCCH}$ (i) is a transmission bandwidth of PUCCH in PUCCH transmission occasion i on activated uplink BWP b of carrier f of primary serving cell c, in unit of RB. It should be noted that the subcarrier spacing of BWP b is µ.

$PL_{b,f,c}(q_d)$ is a parameter related to pathloss.

$\Delta_{F\_PUCCH}(F)$ is a parameter related to PUCCH format.

$g_{b,f,c}(i,l)$ is a closed-loop power parameter.

$\Delta_{TF,b,f,c}(i)$ is a PUCCH transmission power adjustment parameter for PUCCH transmission occasion i on activated uplink BWP b of carrier f of primary serving cell c, for PUCCH format 2, and/or PUCCH format 3 and/or PUCCH format 4, and a number of UCI (for example, UCI of the higher priority) bits is less than or equal to 11, and is greater than 2 (or greater than or equal to 3), $\Delta_{TF,b,f,c}$ (i)=10 $\log_{10}$ ($K_1 \cdot (n_{HARQ-ACK}$ (i)+$O_{SR}$ (i)+$O_{CSI}$(i))/$N_{RE}$ (i)), where:

$K_1=6$ $n_{HARQ-ACK}$ (i) is a number of HARQ-ACK information bits for power control. For example, $n_{HARQ-ACK}$(i) may be a number of HARQ-ACK information bits of the higher priority for power control.

$O_{SR}$(i) is a number of SR information bits. For example, $O_{SR}$(i) may be a number of SR information bits of the higher priority.

$O_{CSI}$ (i) is a number of CSI information bits. For example, the number of CSI information bits of the higher priority may be 0.

$N_{RE}$(i) is a number of REs) for UCI transmission. For example, $N_{RE}$(i)=min($M_{RB}^{PUCCH} \cdot N_{sc,ctrl}^{RB} \cdot N_{symb-UCI}^{PUCCH}, \lceil (O_{UCI,1}+O^{CRC,1})/ (Q_m \cdot r_1) \rceil$), where $N_{sc,ctrl}^{RB}$(i) is a number of subcarriers per RB excluding subcarriers used for DMRS (Demodulation Reference Signal), and $N_{symb-UCI}^{PUCCH}$ is a number of OFDM symbols excluding OFDM symbols used for DMRS. $O^{UCI,1}$ is a number of UCI bits of priority 1, $O_{CRC,11}$ is a number (e.g., 0) of CRC bits of priority 1, $Q_m$ is a modulation order, and $r_1$ is a code rate of UCI of priority 1.

For PUCCH format 2, and/or PUCCH format 3 and/or PUCCH format 4, and a number of UCI (for example, UCI of the higher priority) bits is greater than 11, $\Delta_{TF,b,f,c}$(i)=10 $\log_{10}(2^{K_2 \cdot BPRE(i)}-1)$, where:

$K_2=2.4$.

$BPRE(i)=(O_{ACK}(i)+O_{SR}(i)+O_{CSI}(i)+O_{CRC}(i))/N_{RE}$ (i).

$O_{ACK}(O)$ is a number of HARQ-ACK information bits. For example, $O_{ACK}$ (i) may be a number of HARQ-ACK information bits of the higher priority.

$O_{SR}(i)$ is a number of SR information bits, for example, $O_{SR}(i)$ may be a number of SR information bits of the higher priority.

$O_{CSI}(i)$ is a number of CSI information bits. For example, the number of CSI information bits of the higher priority may be 0.

$N_{RE}$(i) is a number of REs for UCI transmission. For example, $N_{RE}$(i)=min($M_{RB}^{PUCCH} \cdot N_{sc,ctrl}^{RB} \cdot N_{symb-UCI}^{PUCCH}, \lceil (O_{UCI,1}+O_{CRC,1})/ (Q_m \cdot r_1) \rceil$), where $N_{sc,ctrl}^{RB}$ (i) is a number of subcarriers per RB excluding subcarriers used for DMRS, and $N_{symb-UCI}^{PUCCH}$ is a number of OFDM symbols excluding OFDM symbols used for DMRS. $O_{UCI,1}$ is a number of UCI bits of priority 1, $O_{CRC,1}$ is a number of CRC bits of priority 1, $Q_m$ is a modulation order, and $r_1$ is a code rate of UCI of priority 1.

In some other examples, if the UE transmit a PUCCH on activated uplink BWP b of carrier f in primary serving cell c using PUCCH power control adjustment state with index l, the UE determines the PUCCH transmission power $P_{PUCCH,b,f,c}(i,q_u,q_d,l)$ in PUCCH transmission occasion i as Equation (3):

$$(3)$$

$$P_{PUCCH,b,f,c}(i, q_u, q_d, l) =$$

$$\min\left\{\begin{array}{l} P_{CMAX,f,c}(i), \\ P_{O\_PUCCH,b,f,c}(q_u) + 10\log_{10}\left(2^\mu \cdot M_{RB,b,f,c}^{PUCCH}(i)\right) + \\ PL_{b,f,c}(q_d) + \Delta_{F\_PUCCH}(F) + \Delta_{TF,b,f,c}(i) + g_{b,f,c}(i, l) \end{array}\right\}$$

[dBm (decibel milliwatt)]

In the above Equation (3):

$P_{CMAX,f,c}(i)$ is the configured maximum output power for carrier f of primary serving cell c in PUCCH transmission occasion i.

$P_{O\_PUCCH,b,f,c}(q_u)$ is an open-loop power parameter.

$M_{RB,b,f,c}^{PUCCH}(i)$ is a transmission bandwidth of PUCCH in PUCCH transmission occasion i on activated uplink BWP b of carrier f of primary serving cell c, in unit of RB. It should be noted that the subcarrier spacing of BWP b is μ.

$PL_{b,f,c}(q_d)$ is a parameter related to pathloss.

$\Delta_{F\_PUCCH}(F)$ is a parameter related to PUCCH format.

$g_{b,f,c}(i,l)$ is a closed-loop power parameter.

$\Delta_{TF,b,f,c}(i)$ is a PUCCH transmission power adjustment parameter for PUCCH transmission occasion i on activated uplink BWP b of carrier f of primary serving cell c, for PUCCH format 2, and/or PUCCH format 3 and/or PUCCH format 4, and a number of UCI (for example, UCI of the higher priority) bits is less than or equal to 11, $\Delta_{TF,b,f,c}(i)=10\log_{10}(K_1 \cdot (n_{HARQ-ACK}(i)+O_{SR}(i)+O_{CSI}(i))/N_{RE}(i))$ where:

$K_1=6$.

$n_{HARQ-ACK}(i)$ is a number of HARQ-ACK information bits for power control. For example, when the number of UCI bits of the higher priority is greater than 2 (or greater than or equal to 3), $n_{HARQ-ACK}(i)$ may be a number of HARQ-ACK information bits of the higher priority for RM power control. When the number of UCI bits of the higher priority is less than 3 (or less than or equal to 2), $n_{HARQ-ACK}(i)$ is the number of UCI bits of the higher priority.

$O_{SR}(i)$ is a number of SR information bits. For example, $O_{SR}(i)$ may be the number of SR information bits of the higher priority.

$O_{CSI}(i)$ is a number of CSI information bits. For example, the number of CSI information bits of the higher priority may be 0.

$N_{RE}(i)$ is a number of REs for UCI transmission. For example, $N_{RE}(i)$ $\min(M_{RB}^{PUCCH} \cdot N_{sc,ctrl}^{RB} \cdot N_{symb-UCI}^{PUCCH}, \lceil(O_{UCI,1}+O_{CRC,1})(Q_m \cdot r_1)\rceil)$, where $N_{sc,ctrl}^{RB}(i)$ is a number of subcarriers per RB excluding subcarriers used for DMRS, and $N_{symb-UCI}^{PUCCH}$ is a number of OFDM symbols excluding OFDM symbols used for DMRS. $O_{UCI,1}$ is a number of UCI bits of priority 1, $O_{CRC,1}$ is a number (e.g., 0) of CRC bits of priority 1, $Q_m$ is a modulation order, and $r_1$ is a code rate of UCI of priority 1.

For PUCCH format 2, and/or PUCCH format 3 and/or PUCCH format 4, and a number of UCI (e.g., UCI of the higher priority) bits is greater than 11, $\Delta_{TF,b,f,c}(i)=10\log_{10}(2^{K_2 \cdot BPRE(i)}-1)$, where:

$K_2=2.4$.

$BPRE(i)=O_{ACK}(i)+O_{SR}(i)+O_{CSI}(i)+O_{CRC}(i))/N_{RE}(i)$.

$O_{ACK}(i)$ is a number of HARQ-ACK information bits. For example, $O_{ACK}(i)$ may be the number of HARQ-ACK information bits of the higher priority.

$O_{SR}(i)$ is a number of SR information bits, for example, $O_{SR}(i)$ may be the number of SR information bits of the higher priority.

$O_{CSI}(i)$ is a number of CSI information bits. For example, the number of CSI information bits of the higher priority may be 0.

$N_{RE}(i)$ is a number of REs for UCI transmission. For example, $N_{RE}(i)=\min(M_{RB}^{PUCCH} \cdot N_{sc,ctrl}^{RB} \cdot N_{symb-UCI}^{PUCCH}, \lceil(O_{UCI,1}+O_{CRC,1})/(Q_m \cdot r_1)\rceil)$, where $N_{sc,ctrl}^{RB}(i)$ is a number of subcarriers per RB excluding subcarriers used for DMRS, and $N_{symb-UCI}^{PUCCH}$ is a number of OFDM symbols excluding OFDM symbols used for DMRS. $O_{UCI,1}$ is a number of UCI bits of priority 1, $O_{CRC,1}$ is a number of CRC bits of priority 1, $Q_m$ is a modulation order, and $r_1$ is a code rate of UCI of priority 1.

When PUCCH format 2/3/4 is used to transmit UCI information of the higher priority and UCI information of the lower priority, a number of UCI bits of the higher priority may be less than three bits. At this time, the power control method using RM coding may cause the transmission power to be too large or too small. The method improves the reliability of uplink transmission and avoids the situation where the PUCCH transmission power is excessive or insufficient.

FIG. 8 is a flowchart illustrating a method performed by a terminal (e.g., a UE) according to an embodiment.

Referring to FIG. 8, in step S810, downlink channels are received and/or uplink channels are transmitted from one or more uplink channels and/or one or more downlink channels. The one or more uplink channels may include a first uplink channel and/or a second uplink channel, and the one or more downlink channels may include a first downlink channel and/or a second downlink channel.

The first uplink channel may be a CG PUSCH, and/or the second uplink channel may be a PUSCH scheduled by a DCI or a PUSCH repetition among multiple PUSCH repetitions scheduled by a DCI or a PUCCH, and/or the first downlink channel may be an SPS PDSCH, and/or the second downlink channel may be a PDSCH scheduled by a DCI or a PDSCH repetition among multiple PDSCH repetitions scheduled by a DCI.

When the first uplink channel collides with the second uplink channel and/or the second downlink channel, receiving downlink channels and/or transmitting uplink channels from one or more uplink channels and/or one or more downlink channels may include:

resolving collision among the one or more downlink channels and the one or more uplink channels; and/or resolving collision among the one or more uplink channels; and/or resolving collision among the one or more downlink channels.

Resolving collision among the one or more downlink channels and the one or more uplink channels may include: not transmitting (or canceling transmission of) the first uplink channel or not transmitting time units (e.g., symbols) of the first uplink channel that collide with the second uplink channel and/or the first downlink channel when a first predefined condition is satisfied.

The first predefined condition may include at least one of the following:

the terminal has not reported a capability with respect to partial cancellation of uplink transmission (e.g., a capability of [partialCancellation]);

the terminal has reported a capability with respect to partial cancellation of uplink transmission (e.g., a capability of [partialCancellation]);

a time interval between an end (or starting) position (e.g., symbol) of a PDCCH scheduling the first downlink channel and a starting position (e.g., symbol) of the first uplink channel is greater than a first predefined time; or a time interval between an end (or starting) position (e.g., symbol) of a PDCCH scheduling the first downlink channel and a starting position (e.g., symbol) of the first uplink channel and/or another uplink channel that collides with the first uplink channel (e.g., an earliest starting position or all starting positions) is greater than a second predefined time.

The first predefined time and/or the second predefined time may be an uplink channel (e.g., PUSCH) preparation time for a corresponding uplink channel (e.g., PUSCH) processing capability, such as parameter $T_{proc,2}$.

When the first downlink channel collides with the second uplink channel and/or the second downlink channel, receiving downlink channels and/or transmitting uplink channels from one or more uplink channels and/or one or more downlink channels may include:

resolving collision among the one or more downlink channels and the one or more uplink channels; and/or resolving collision among the one or more downlink channels.

Resolving collision among the one or more downlink channels and the one or more uplink channels may include not receiving the first downlink channel when a second predefined condition is satisfied.

The second predefined condition may include at least one of the following:

the terminal has not reported a capability with respect to partial cancellation of uplink transmission;

the terminal has reported a capability with respect to partial cancellation of uplink transmission;

a time interval between an end (or starting) position (e.g., symbol) of a PDCCH scheduling the second downlink channel and a starting position (e.g., symbol) of the first uplink channel is greater than a third predefined time; or a time interval between an end position of a PDCCH scheduling the second downlink channel and a starting position of the first downlink channel and/or another downlink channel that collides with the first downlink channel is greater than a fourth predefined time.

The third predefined time and/or the fourth predefined time may be a predetermined number (e.g., 14) of time units (e.g., symbols).

When the first downlink channel collides with the second downlink channel, receiving downlink channels and/or transmitting uplink channels from one or more uplink channels and/or one or more downlink channels may include:

resolving collision among the first downlink channel and symbols indicated as uplink and/or flexible by higher layer signaling; and/or resolving collision among the first downlink channel and other downlink channels of the one or more downlink channels; and/or resolving collision among the first downlink channel and symbols indicated as uplink and/or flexible by dynamic signaling; and/or resolving collision among the one or more downlink channels and the one or more uplink channels.

When the first uplink channel collides with the second uplink channel, receiving downlink channels and/or transmitting uplink channels from one or more uplink channels and/or one or more downlink channels may include:

resolving collision among the first uplink channel and symbols indicated as downlink and/or flexible by higher layer signaling; and/or resolving collision among the first uplink channel and other uplink channels of the one or more uplink channels; and/or resolving collision among the first uplink channel and symbols indicated as downlink and/or flexible by dynamic signaling; and/or resolving collision among the one or more downlink channels and the one or more uplink channels.

When the terminal is configured to be able to receive one or more downlink channels scheduled by a DCI on a serving cell, in case that the serving cell is configured with downlink channel bundling (e.g., PDSCH bundling) in the time domain, power for uplink transmission may be determined based on a downlink channel associated with the last SLIV in a TDRA row indicated by a DCI.

A scheduled PDSCH may be a dynamically scheduled PDSCH (e.g., a PDSCH scheduled by a DCI), and/or a PDSCH to be received configured by higher layer signaling (e.g., an SPS PDSCH). For example, a scheduled PUSCH may be a dynamically scheduled PUSCH (e.g., a PUSCH scheduled by a DCI, which may be referred to as a DG PUSCH herein), and/or a PUSCH not scheduled by a DCI (e.g., a PUSCH with a CG, which may be referred to as a CG PUSCH herein).

The method of FIG. 8 may further include feeding back (e.g., transmitting or reporting) HARQ-ACK information for at least one received PDSCH.

A physical channel to be received and/or a physical channel to be transmitted may be determined based on at least one of the above-described various manners, such as Manners MN1-MN16.

The method of FIG. 8 may include methods or operations that can be performed by a terminal (e.g., UE) in various embodiments described above.

Figure 9:
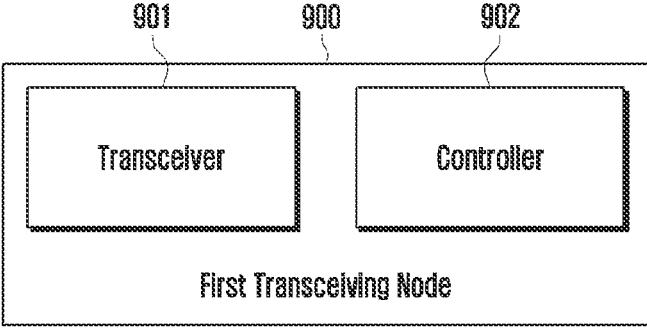
FIG. 9 illustrates a first transceiving node according to an embodiment.

FIG. 9 illustrates a first transceiving node according to an embodiment.

Referring to FIG. 9, the first transceiving node 900 includes a transceiver 901 and a controller 902.

The transceiver 901 is configured to transmit first data and/or first control signaling to a second transceiving node and to receive second data and/or second control signaling from the second transceiving node in a time unit.

The controller 902 may be an ASIC or at least one processor. The controller 902 is configured to control the overall operation of the first transceiving node, including controlling the transceiver 901 to transmit the first data and/or the first control signaling to the second transceiving node and to receive the second data and/or the second control signaling from the second transceiving node in a time unit.

The controller 902 is configured to perform one or more operations in the methods of various embodiments described above.

Although the first transceiving node is illustrated as a base station and the second transceiving node is illustrated as a UE, these illustrations are examples and the present disclosure is not limited thereto. The first data and/or the first control signaling is illustrated by taking downlink data and/or downlink control signaling as an example but is not limited thereto. The HARQ-ACK codebook may be included in the second control signaling, which is illustrated by an uplink control signaling but is not limited thereto.

Figure 10:
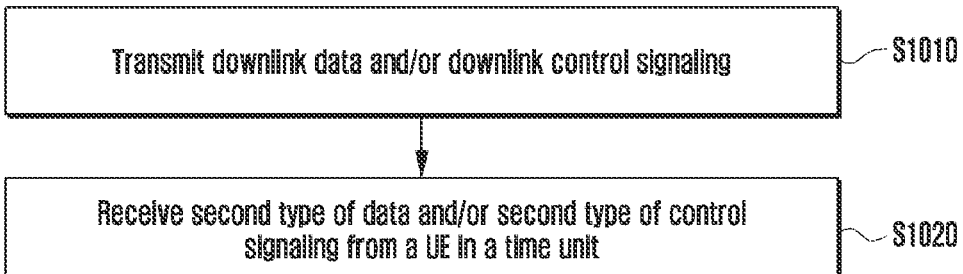
FIG. 10 is a flowchart illustrating a method performed by a base station according to an embodiment.

FIG. 10 is a flowchart illustrating a method performed by a base station according to an embodiment.

Referring to FIG. 10, in step S1010, a base station transmits downlink data and/or downlink control information.

In step S1020, the base station receives second data and/or second control signaling information from a UE in a time unit.

The method of FIG. 10 may also include one or more of the operations performed by a base station described in various embodiments of the disclosure.

Also provided is a communication method of a base station in a wireless communication system that includes transmitting at least one of one or more downlink channels and receiving uplink channels from one or more uplink channels, with downlink channels of the one or more downlink channels being received. The one or more uplink channels include a first uplink channel and/or a second uplink channel, and the one or more downlink channels include a first downlink channel and/or a second downlink channel.

Another embodiment provides a base station in a wireless communication system that includes a transceiver configured to transmit and receive signals, and a controller coupled to the transceiver and configured to perform the above described operations.

Also provided is a computer-readable storage medium having stored thereon one or more computer programs thereon, with any of the above-described methods implemented when the one or more computer programs being performed by one or more processors.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of the above described embodiments.

The various illustrative logic blocks, modules, and circuits described in this application may be implemented or performed by a general purpose processor, a digital signal processor (DSP), an ASIC, a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm, as described above, may be embodied directly in hardware, in a software module executed by a processor, or in a combination thereof. The software module may reside in RAM memory, flash memory, ROM memory, erasable programable read only memory (EPROM), electronically erasable programable read only memory (EEPROM), register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:

detecting a downlink control information (DCI) format scheduling one or more physical downlink shared channels (PDSCHs);

receiving the one or more PDSCHs;

determining a number of hybrid automatic repeat request-acknowledgement (HARQ-ACK) information bits based on a number of transport blocks the terminal receives in a PDSCH reception occasion for a serving cell; and obtaining a transmission power for a physical uplink control channel (PUCCH) based on the number of HARQ-ACK information bits, the PUCCH being for HARQ-ACK information associated with the one or more PDSCHs, wherein, in case that the terminal is configured with time domain HARQ bundling for the serving cell and for the DCI format indicating a time domain resource allocation (TDRA) row that includes more than one start and length indicator (SLIV) on the serving cell, the number of HARQ-ACK information bits is determined by considering that only a PDSCH associated with a last SLIV in the TDRA row indicated by the DCI format is received.

2. The method of claim 1, wherein, in case that the terminal is configured with the time domain HARQ bundling for the serving cell and for the DCI format indicating the TDRA row that includes more than one SLIV on the serving cell, the number of transport blocks is determined based on the PDSCH associated with the last SLIV.

3. The method of claim 1, further comprising:
identifying that a first uplink channel collides with the PUCCH and a first downlink channel;
resolving a collision between the first uplink channel and the first downlink channel by not transmitting a time unit of the first uplink channel that collides with the first downlink channel in case that a first predefined condition is satisfied;
resolving a collision between the first uplink channel and the PUCCH; and
performing a downlink reception or an uplink transmission based on at least one of the first uplink channel, the PUCCH or the first downlink channel,
wherein the first predefined condition includes at least one of:
the terminal having reported a capability with respect to partial cancellation of an uplink transmission,
a time interval between an end position of a physical downlink control channel (PDCCH) scheduling the first downlink channel and a starting position of the first uplink channel being greater than a first predefined time, or
a time interval between the end position of the PDCCH scheduling the first downlink channel and a starting position of another uplink channel that collides with the first uplink channel being greater than a second predefined time.

4. The method of claim 3,
wherein the first predefined time is a preparation time for the first uplink channel.

5. The method of claim 3,
wherein the first predefined condition includes the terminal having not reported a capability with respect to partial cancellation of an uplink transmission.

6. The method of claim 3, further comprising:
identifying that the first downlink channel collides with the PUCCH; and
resolving a collision between the first downlink channel and the PUCCH by not receiving the first downlink channel, in case that a second predefined condition is satisfied.

7. The method of claim 6, wherein:
the first uplink channel is a configured grant (CG) physical uplink shared channel (PUSCH), and
the first downlink channel is a semi-persistent scheduling (SPS) PDSCH.

8. The method of claim 6, wherein the second predefined condition includes one of:
the terminal having not reported a capability with respect to partial cancellation of the uplink transmission, or
the terminal having reported the capability with respect to partial cancellation of the uplink transmission.

9. The method of claim 3, further comprising:
in case that the first downlink channel collides with at least one of an uplink symbol or a flexible symbol configured by higher layer signaling or a DCI format, resolving a collision between the first downlink channel and the at least one of the uplink symbol or the flexible symbol by not receiving the first downlink channel.

10. The method of claim 3, further comprising:
in case that the first uplink channel collides with at least one of a downlink symbol or a flexible symbol configured by higher layer signaling or DCI format, resolving a collision between the first uplink channel and the at least one of the downlink symbol or the flexible symbol by not transmitting the first uplink channel.

11. A terminal in a wireless communication system, the terminal comprising:
a transceiver configured to transmit and receive signals; and
a controller coupled to the transceiver and configured to:
detect a downlink control information (DCI) format scheduling one or more physical downlink shared channels (PDSCHs),
receive the one or more PDSCHs,
determine a number of hybrid automatic repeat request-acknowledgement (HARQ-ACK) information bits based on a number of transport blocks the terminal receives in a PDSCH reception occasion for a serving cell, and
obtain a transmission power for a physical uplink control channel (PUCCH) based on the number of HARQ-ACK information bits, the PUCCH being for HARQ-ACK information associated with the one or more PDSCHs,
wherein, in case that the terminal is configured with time domain HARQ bundling for the serving cell and for the DCI format indicating a time domain resource allocation (TDRA) row that includes more than one start and length indicator (SLIV) on the serving cell, the number of HARQ-ACK information bits is determined by considering that only a PDSCH associated with a last SLIV in the TDRA row indicated by the DCI format is received.

12. The terminal of claim 11, wherein the controller is further configured to:
identify that a first uplink channel collides with the PUCCH and a first downlink channel,
resolve a collision between the first uplink channel and the first downlink channel by not transmitting a time unit of the first uplink channel that collides with the first downlink channel in case that a first predefined condition is satisfied,
resolve a collision between the first uplink channel and the PUCCH, and
perform a downlink reception or an uplink transmission based on at least one of the first uplink channel, the PUCCH or the first downlink channel,
wherein the first predefined condition includes at least one of:
a time interval between an end position of a physical downlink control channel (PDCCH) scheduling the first downlink channel and a starting position of the first uplink channel being greater than a first predefined time, or
that a time interval between the end position of the PDCCH scheduling the first downlink channel and a starting position of another uplink channel that collides with the first uplink channel being greater than a second predefined time.

13. The terminal of claim 12, wherein the first predefined condition includes one of:

the terminal having not reported a capability with respect to partial cancellation of the uplink transmission, or the terminal having reported the capability with respect to partial cancellation of the uplink transmission.

\* \* \* \* \*